United States Patent
Ryuen et al.

(10) Patent No.: US 7,503,347 B2
(45) Date of Patent: Mar. 17, 2009

(54) LINEAR SOLENOID VALVE

(75) Inventors: Shigeto Ryuen, Sendai (JP); Hideki Furuta, Kakuda (JP); Hidetoshi Watanabe, Shibata-gun (JP); Satoshi Noda, Sendai (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 12/006,899

(22) Filed: Jan. 7, 2008

(65) Prior Publication Data

US 2008/0203342 A1    Aug. 28, 2008

Related U.S. Application Data

(62) Division of application No. 11/083,569, filed on Mar. 17, 2005, now Pat. No. 7,325,564.

(30) Foreign Application Priority Data

| Mar. 24, 2004 | (JP) | .............................. 2004-086016 |
| Mar. 26, 2004 | (JP) | .............................. 2004-091715 |
| Mar. 26, 2004 | (JP) | .............................. 2004-091921 |
| Mar. 29, 2004 | (JP) | .............................. 2004-094066 |

(51) Int. Cl.
*F16K 31/02*   (2006.01)
(52) U.S. Cl. .............................. 137/625.65; 137/625.68; 137/625.69; 251/129.15
(58) Field of Classification Search ............ 251/129.15; 137/625.65, 625.68, 625.69, 625.25
See application file for complete search history.

(56) References Cited

U.S. PATENT DOCUMENTS

| 2,239,312 A | 4/1941 | Berges |
| 3,417,593 A | 12/1968 | Lewis |
| 3,538,954 A | 11/1970 | Bowsher et al. |
| 3,670,768 A | 6/1972 | Griswold |
| 3,791,408 A | 2/1974 | Saitou et al. |
| 3,817,491 A | 6/1974 | Burckhardt et al. |
| 4,250,922 A | 2/1981 | Will et al. |
| 4,278,959 A | 7/1981 | Nishimiya et al. |
| 4,553,735 A | 11/1985 | Brundage |

(Continued)

FOREIGN PATENT DOCUMENTS

EP    0204293 A1    12/1986

(Continued)

OTHER PUBLICATIONS

Japanese Office Action for Application No. 2004-094066, dated Sep. 11, 2007.

(Continued)

*Primary Examiner*—John Bastianelli
(74) *Attorney, Agent, or Firm*—Lahive & Cockfield, LLP; Anthony A. Laurentano, Esq.

(57) ABSTRACT

A linear solenoid valve includes a solenoid having a coil wound around a coil bobbin, a fixed core, and a movable core for being attracted to the fixed core when the coil is energized, and a valve mechanism having a valve element for selectively bringing an inlet port and an outlet port into and out of fluid communication with each other responsive to a displacement of the movable core. The movable core has a nonmagnetic layer formed on an outer surface thereof and having a predetermined thickness.

10 Claims, 29 Drawing Sheets

U.S. PATENT DOCUMENTS

| | | | |
|---|---|---|---|
| 4,611,632 A * | 9/1986 | Kolchinsky et al. | 137/625.65 |
| 4,750,704 A | 6/1988 | Brundage | |
| 4,791,958 A | 12/1988 | Brundage | |
| 4,836,248 A | 6/1989 | Stegmeier et al. | |
| 4,855,702 A | 8/1989 | Swanson et al. | |
| 4,919,390 A | 4/1990 | Ichiryu et al. | |
| 4,944,328 A | 7/1990 | Brundage | |
| 4,947,893 A | 8/1990 | Miller et al. | |
| 5,445,189 A * | 8/1995 | Yamamuro | 137/625.65 |
| 5,467,961 A | 11/1995 | Sausner et al. | |
| 5,476,313 A | 12/1995 | Lauer et al. | |
| 5,518,219 A | 5/1996 | Wenzel et al. | |
| 5,565,832 A | 10/1996 | Haller et al. | |
| 5,707,039 A | 1/1998 | Hamilton et al. | |
| 5,746,412 A | 5/1998 | Niimi | |
| 5,775,670 A | 7/1998 | Osterbrink | |
| 5,853,028 A | 12/1998 | Ness et al. | |
| 5,856,771 A | 1/1999 | Nippert | |
| 5,865,907 A | 2/1999 | Katayama et al. | |
| 5,899,436 A | 5/1999 | Holmes et al. | |
| 5,992,822 A | 11/1999 | Nakao et al. | |
| 6,029,703 A | 2/2000 | Erickson et al. | |
| 6,089,467 A | 7/2000 | Fochtman et al. | |
| 6,142,445 A | 11/2000 | Kawaguchi et al. | |
| 6,187,459 B1 | 2/2001 | Katayama et al. | |
| 6,220,275 B1 | 4/2001 | Nishinosono et al. | |
| 6,225,886 B1 | 5/2001 | Kleinert et al. | |
| 6,269,827 B1 | 8/2001 | Potter | |
| 6,315,268 B1 | 11/2001 | Cornea et al. | |
| 6,386,220 B1 | 5/2002 | Koenings | |
| 6,390,443 B1 | 5/2002 | Katayama et al. | |
| 6,530,528 B2 | 3/2003 | Breyer et al. | |
| 6,578,606 B2 | 6/2003 | Neuhaus et al. | |
| 6,621,190 B1 | 9/2003 | Asao et al. | |
| 6,644,622 B2 | 11/2003 | Modien et al. | |
| 6,688,334 B2 * | 2/2004 | Kawamura et al. | 137/625.65 |
| 6,799,746 B2 | 10/2004 | Schafer et al. | |
| 6,918,570 B2 | 7/2005 | Ahn et al. | |
| 2002/0101314 A1 | 8/2002 | Oishi et al. | |
| 2002/0113677 A1 | 8/2002 | Holmes et al. | |
| 2002/0145125 A1 | 10/2002 | Tomoda et al. | |
| 2002/0179874 A1 | 12/2002 | Hofmann et al. | |
| 2003/0184422 A1 | 10/2003 | Matsusaka et al. | |
| 2005/0184841 A1 | 8/2005 | Ryuen et al. | |
| 2005/0218362 A1 | 10/2005 | Furuta et al. | |
| 2005/0218363 A1 | 10/2005 | Furuta et al. | |

FOREIGN PATENT DOCUMENTS

| | | |
|---|---|---|
| JP | 48-79249 | 9/1973 |
| JP | 55-63116 | 4/1980 |
| JP | 56-23719 | 3/1981 |
| JP | 61-112608 | 7/1986 |
| JP | 61-287108 | 12/1986 |
| JP | 62-136807 | 6/1987 |
| JP | 63-56371 | 3/1988 |
| JP | 63-56371 | 4/1988 |
| JP | 64-51765 | 3/1989 |
| JP | 2-91906 | 3/1990 |
| JP | 4-350331 | 12/1992 |
| JP | 5-11410 | 2/1993 |
| JP | 6-244023 | 9/1994 |
| JP | 6-302237 | 10/1994 |
| JP | 07-011397 | 1/1995 |
| JP | 7-302709 | 11/1995 |
| JP | 2-288134 | 11/1996 |
| JP | 8-288134 | 11/1996 |
| JP | 8-306527 | 11/1996 |
| JP | 8-316030 | 11/1996 |
| JP | 9-27426 | 1/1997 |
| JP | 9-115725 | 5/1997 |
| JP | 10-74616 | 3/1998 |
| JP | 10-223432 | 8/1998 |
| JP | 10-231946 | 9/1998 |
| JP | 2000-36409 | 2/2000 |
| JP | 2000-083338 | 3/2000 |
| JP | 2000-277327 | 10/2000 |
| JP | 2001-148309 | 5/2001 |
| JP | 2001-263141 | 9/2001 |
| JP | 2002-222710 | 8/2002 |
| JP | 2002-299118 | 10/2002 |
| JP | 2002-307104 | 10/2002 |
| JP | 2003-074731 | 3/2003 |
| JP | 2003-106471 | 4/2003 |
| JP | 2005-207461 | 8/2005 |

OTHER PUBLICATIONS

Japanese Office Action for Application No. 2004-082443, dated Oct. 9, 2007.

Japanese Office Action for Application No. 2004-100955, dated Oct. 9, 2007.

Japanese Office Action for Application No. 2004-012762, dated Apr. 1, 2008.

Japanese Office Action for Application No. 2004-082443, dated Apr. 15, 2008.

Japanese Office Action for Application No. 2004-100955, dated Apr. 15, 2008.

Japanese Office Action for Application No. 2004-100977, dated Apr. 15, 2008.

Japanese Office Action for Application No. 2004-100955, dated Jul. 1, 2008.

Japanese Office Action for Application No. 2005-089856, dated Dec. 24, 2008.

Japanese Office Action for Application No. 2004-082443, dated Dec. 16, 2008.

* cited by examiner

LINEAR SOLENOID VALVE

RELATED APPLICATIONS

This application is divisional application of U.S. Ser. No. 11/083,569 filed Mar. 17, 2005 (now allowed) which claims priority to Japanese Patent Application Nos. JP 2004-086016 filed Mar. 24, 2004, JP 2004-091715 filed Mar. 26, 2004, JP 2004-091921 filed Mar. 26, 2004 and JP 2004-094066 filed Mar. 29, 2004. The contents of the aforementioned applications are hereby incorporated by reference.

BACKGROUND OF THE INVENTION

1. Field of the Invention

The present invention relates to a linear solenoid valve for generating an electromagnetic force in proportion to an amount of current supplied to a solenoid and displacing a valve element under the generated electromagnetic force.

2. Description of the Related Art

There have been used in the art electromagnetic valves for displacing a valve element by attracting a movable core to a fixed core under an electromagnetic force that is generated when a solenoid coil is energized.

Japanese Utility Model Laid-Open Publication No. 63-56371, for example, discloses a technical idea for coating the entire surface of a movable core of a solenoid-operated valve with a nonmagnetic, wear-resistant thin film for suppressing a reduction in the density of magnetic fluxes produced by a magnetic circuit of the solenoid-operated valve.

With the solenoid-operated valve disclosed in Japanese Utility Model Laid-Open Publication No. 63-56371, however, since the entire surface of the movable core, which is of a predetermined diameter, is coated with the thin film, the outside diameter of the movable core is increased by the thickness of the thin film. Consequently, it is necessary to manage not only the outside diameter of the movable core itself, but also the thickness of the applied thin film.

Furthermore, because the thin film applied to the entire surface of the movable core may possibly be peeled off or swollen on the outer surface of the movable core, the disclosed solenoid-operated valve needs to incorporate some countermeasures for preventing the thin film from being peeled off or swollen on the outer surface of the movable core.

There is a demand for increased coaxial alignment between a yoke and a fixed core of the solenoid-operated valve for reducing hysteresis that occurs when the movable core is reciprocally moved.

SUMMARY OF THE INVENTION

It is a general object of the present invention to provide a linear solenoid valve which includes a movable core that does not need to be coated with a nonmagnetic thin film and can produce a magnetic gap highly accurately.

Another object of the present invention is to provide a linear solenoid valve which has a yoke and a fixed core that are held in desired coaxial alignment with each other.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
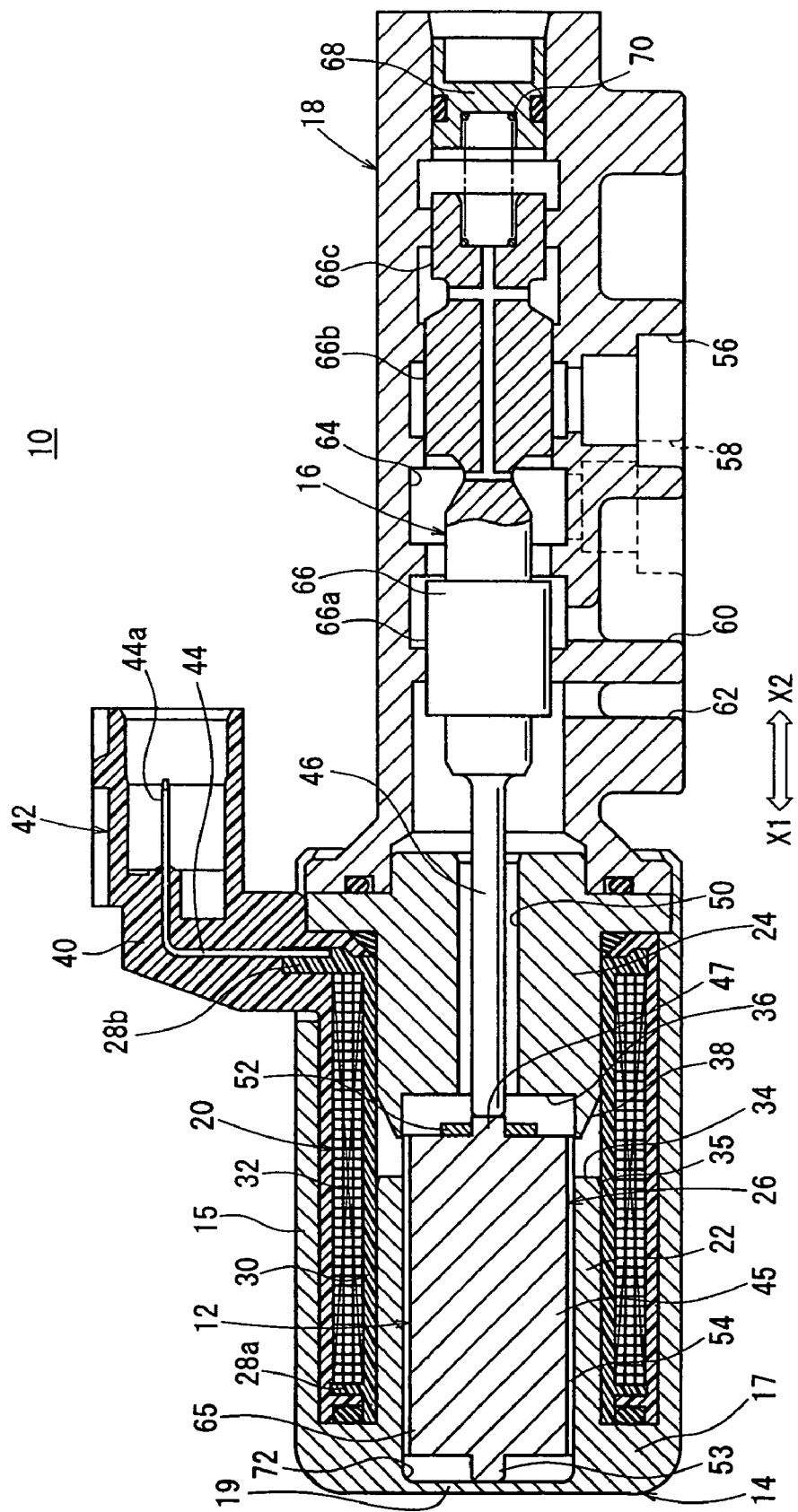
FIG. 1 is a longitudinal cross-sectional view of a hydraulic control valve according to a first embodiment of the present invention, taken along an axial direction thereof.

FIG. 1 shows in longitudinal cross section a hydraulic control valve 10 according to a first embodiment of the present invention.

As shown in FIG. 1, the hydraulic control valve 10 comprises a housing 14 with a solenoid (linear solenoid) 12 disposed therein and a valve body 18 integrally coupled to the housing 14 and housing a valve mechanism 16 therein. The housing 14 and the valve body 18 jointly function as a valve casing. The housing 14 is in the form of a bottomed hollow cylinder made of a magnetic material such as free-cutting steel including SUM (Japanese Industrial Standard (JIS)) or the like.

The housing 14 comprises a hollow cylindrical member 15, a tubular yoke 22 disposed in and spaced radially inwardly a predetermined distance from the hollow cylindrical member 15, the yoke 22 extending substantially parallel to the hollow cylindrical member 15, and a bottom 17 which is thicker than the hollow cylindrical member 15 and joining the left ends of the hollow cylindrical member 15 and the yoke 22. The hollow cylindrical member 15, the yoke 22, and the bottom 17 are formed integrally with each other. The bottom 17 has a recess of substantially U-shaped cross section defined in an inner wall surface thereof, leaving a thin-walled region 19.

The thin-walled region 19 of the bottom 17, which confronts an end face of a movable core 26, described later, functions as a magnetic resistance for minimizing magnetic fluxes flowing through the thin-walled region 19 of the housing 14.

Figure 2:
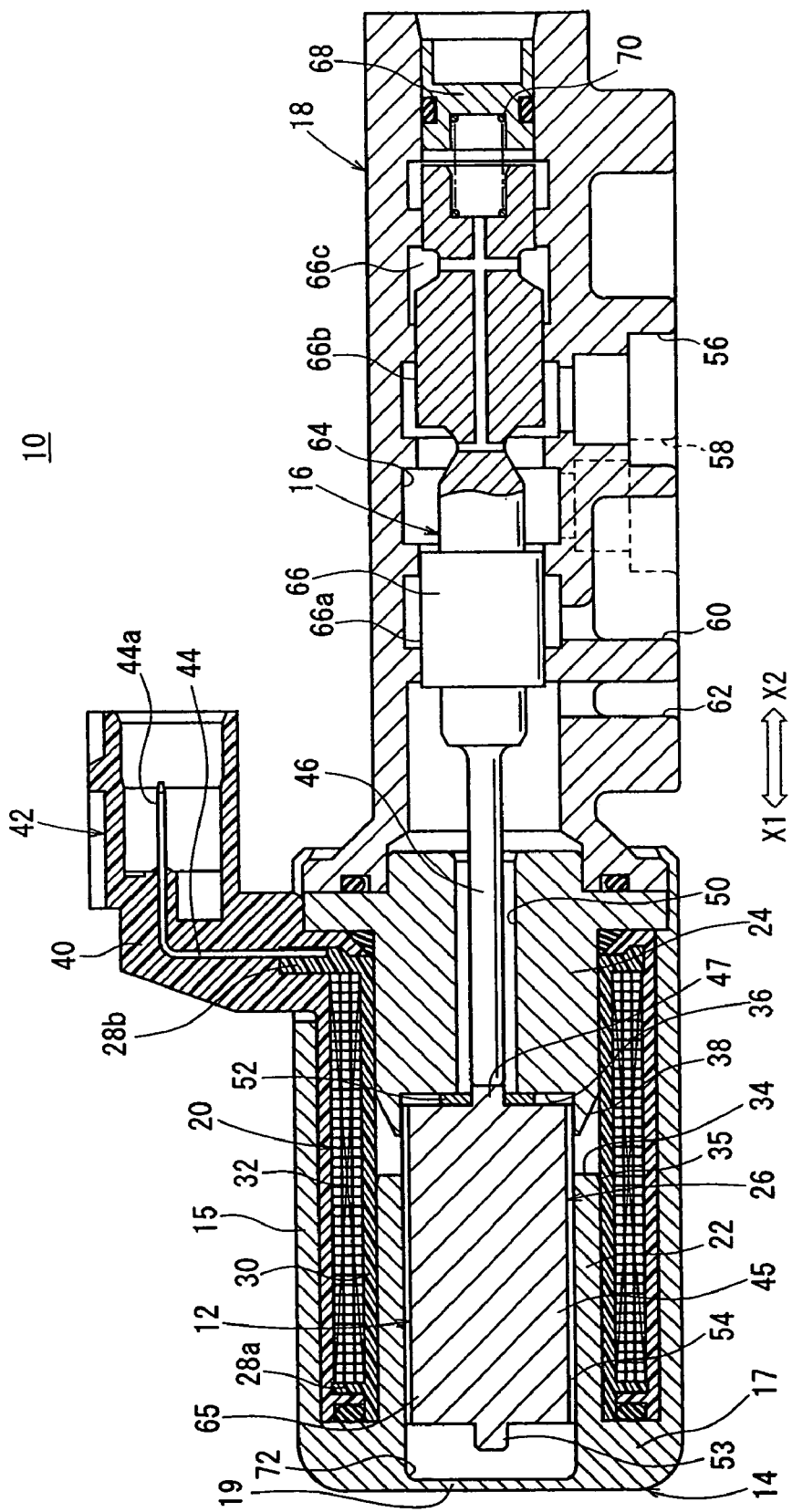
FIG. 2 is a longitudinal cross-sectional view of the hydraulic control valve, showing a spool valve displaced when a solenoid of the hydraulic control valve shown in FIG. 1 is energized.
Figure 5:
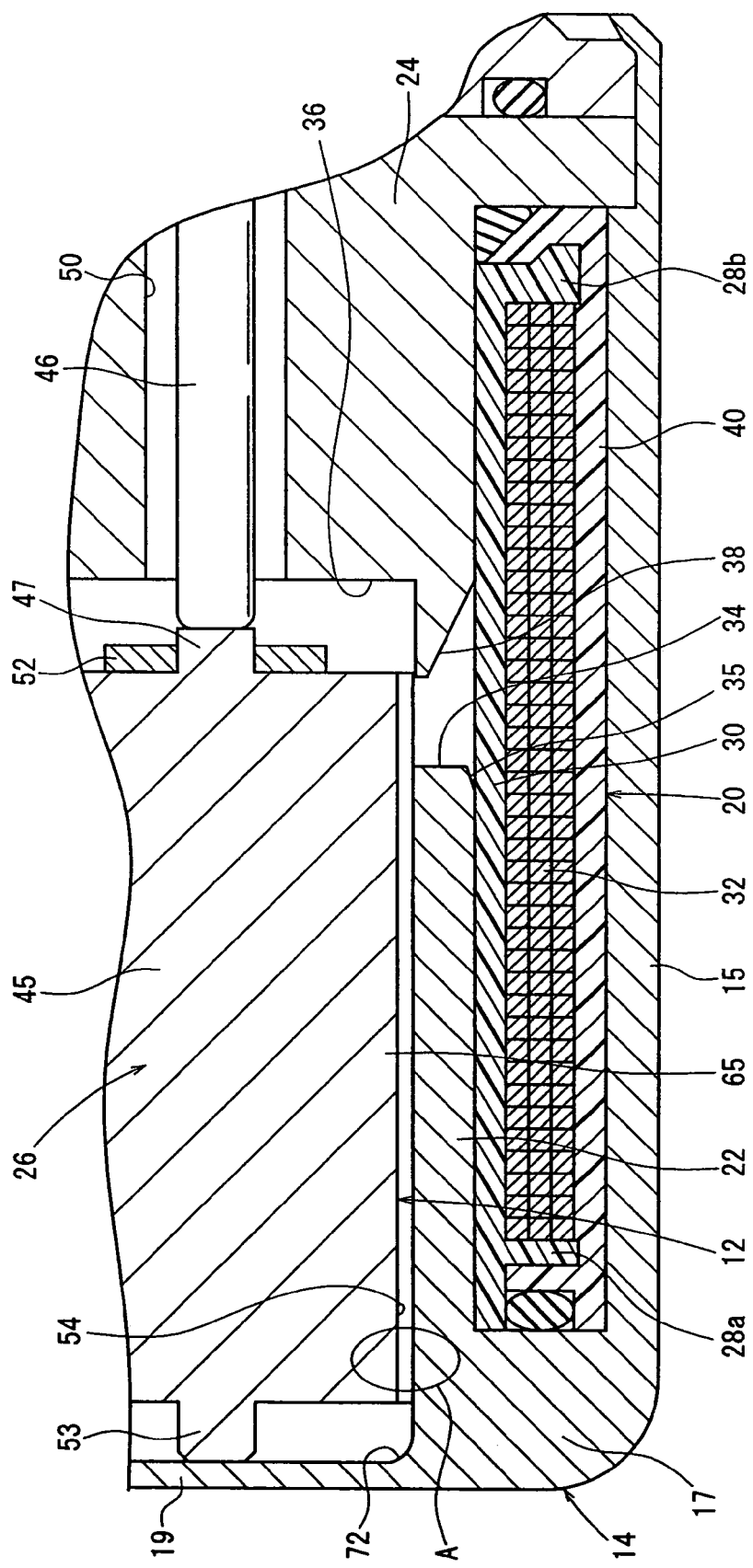
FIG. 5 is an enlarged fragmentary longitudinal cross-sectional view of a coil assembly of the hydraulic control valve shown in FIG. 1.

As shown in FIGS. 1, 2, and 5, the solenoid 12 includes a coil assembly 20 disposed in the housing 14, the tubular yoke 22 formed integrally with the housing 14 at the closed end thereof and disposed in the coil assembly 20, a fixed core 24 joined to an open end of the housing 14 and axially spaced a predetermined clearance from the yoke 22 within the coil assembly 20, and a movable core 26 slidably fitted in the yoke 22 and the fixed core 24.

Figure 6:
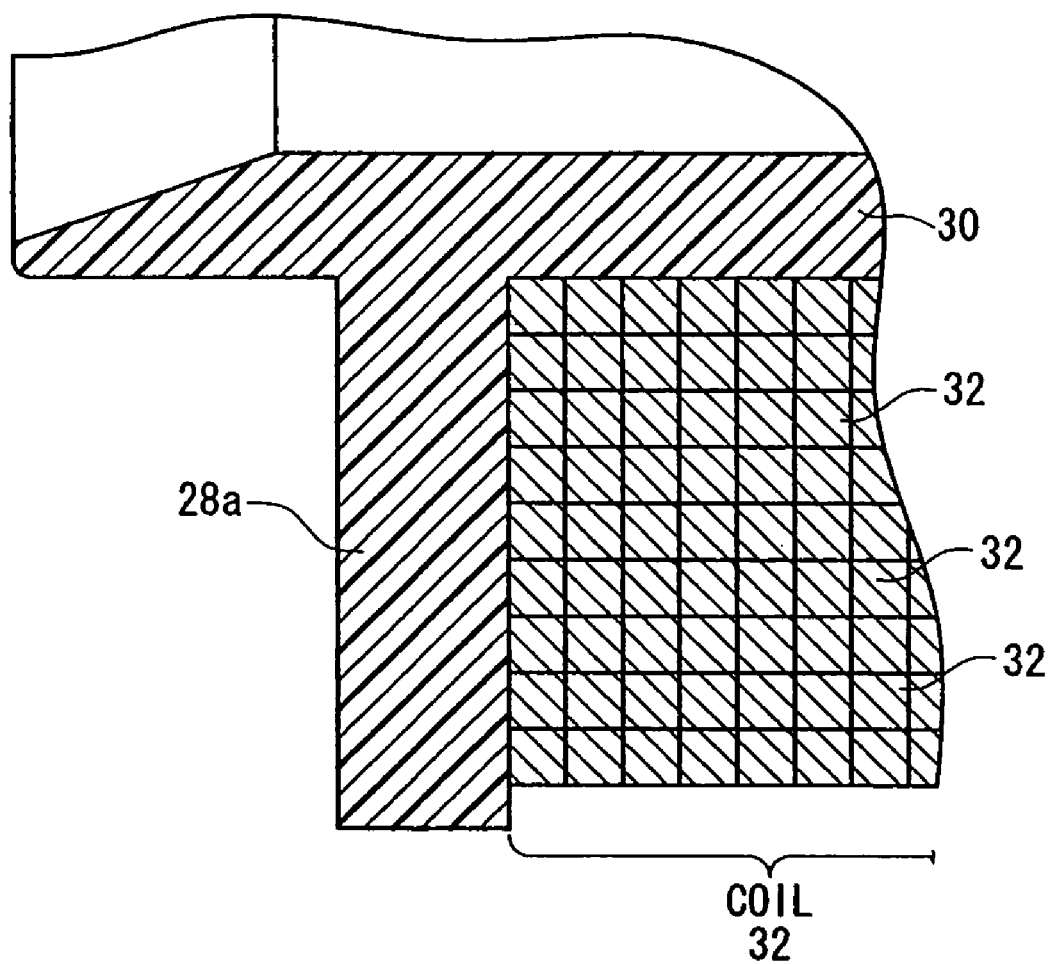
FIG. 6 is an enlarged fragmentary longitudinal cross-sectional view of a coil having a wire of square cross section which is wound around a coil bobbin.

The coil assembly 20 comprises a coil bobbin 30 made of a synthetic resin material and having flanges 28a, 28b disposed on respective axially spaced ends thereof, and a coil 32 having a plurality of turns wound around the coil bobbin 30 and comprising a conductive wire having a square cross section, as shown in FIGS. 5 and 6.

Figure 7:
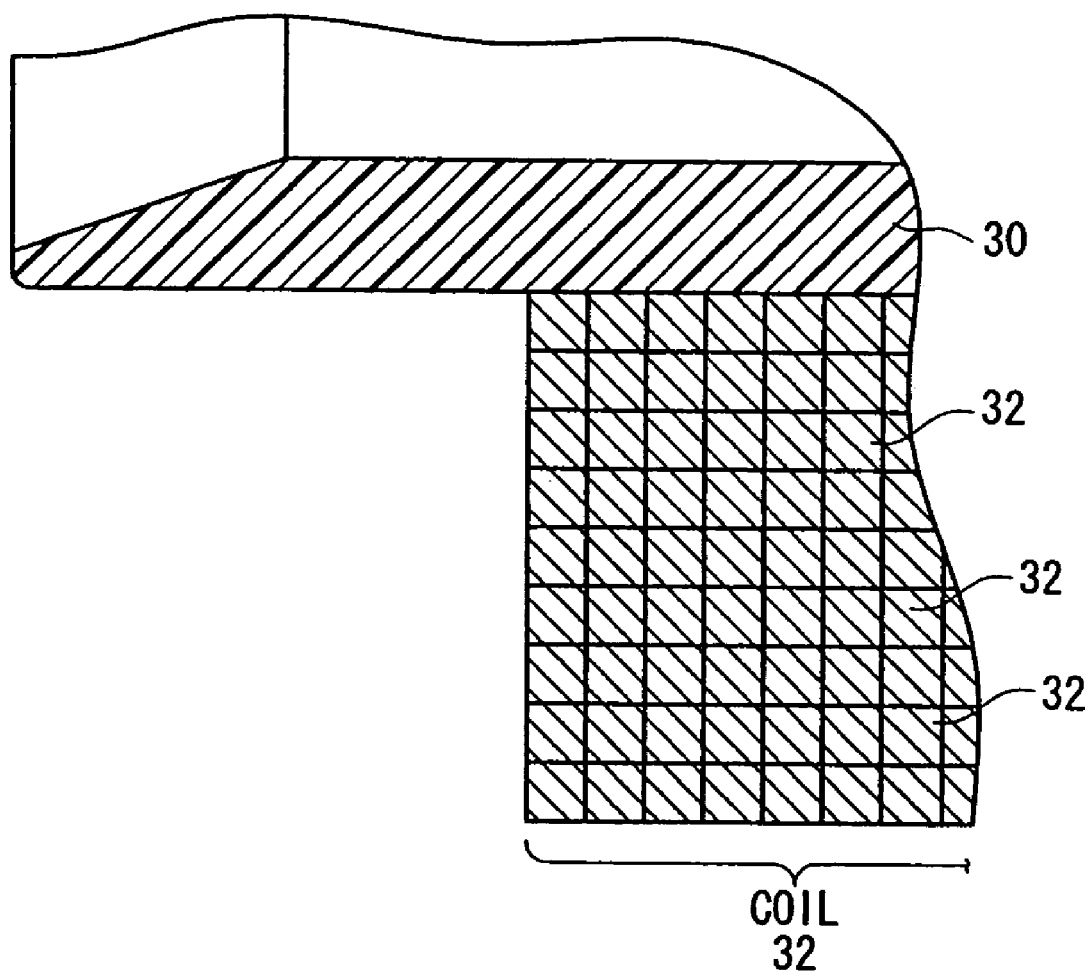
FIG. 7 is an enlarged fragmentary longitudinal cross-sectional view of a coil which is wound around a coil bobbin which is free of a flange.

The coil 32 of square cross section which is wound around the coil bobbin 30 allows its turns held in surface-to-surface contact with each other. Therefore, the turns of the coil 32 are stably arrayed in desired positions. Since the turns of the coil 32 are thus stably arrayed, one of the flanges 28a or 28b may be dispensed with as shown in FIG. 7. If one of the flanges 28a, 28b is dispensed with, the axial dimension of the solenoid 12 is reduced to make the solenoid 12 smaller in size.

Figure 31:
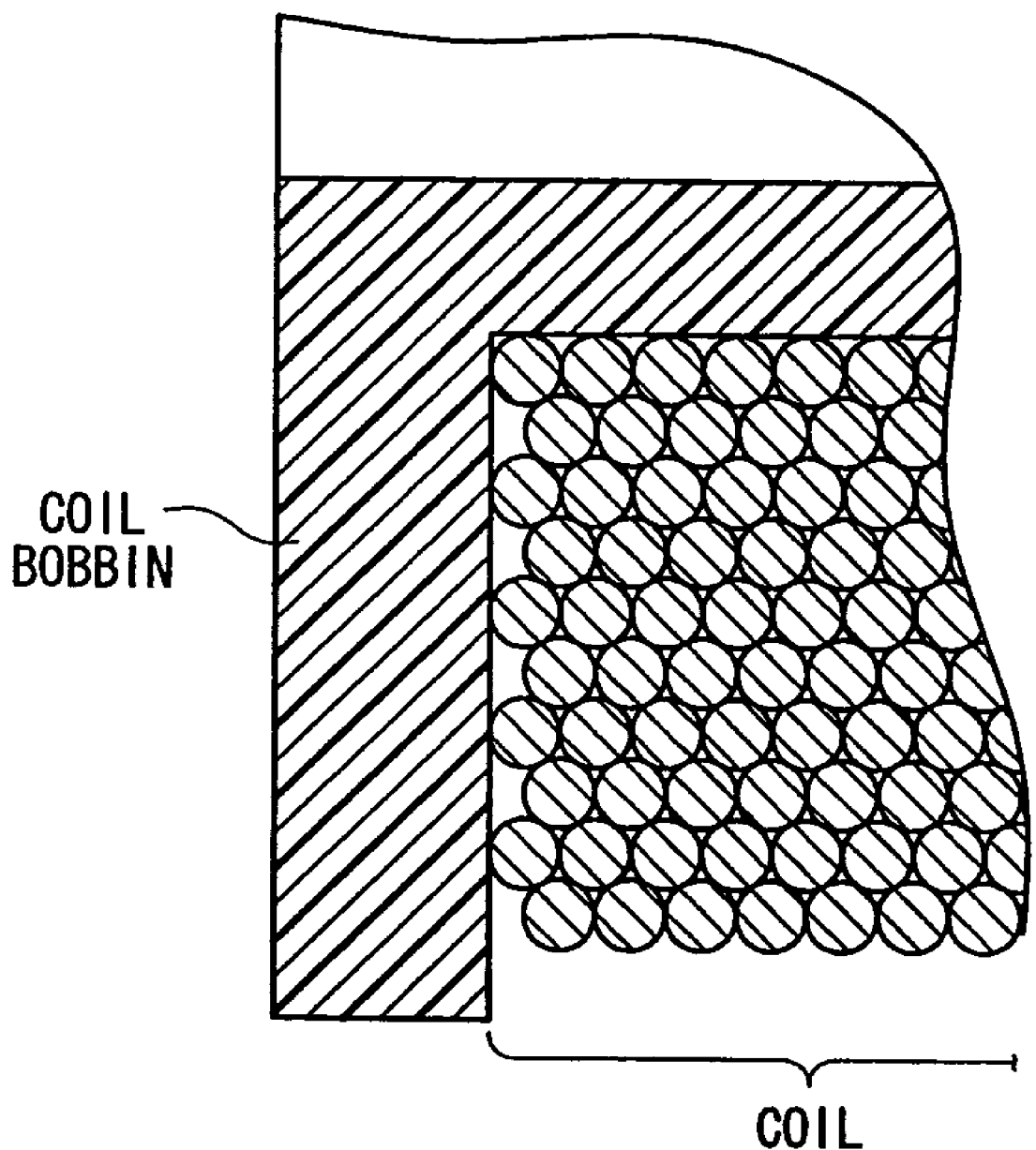
FIG. 31 is an enlarged fragmentary longitudinal cross-sectional view of a conventional coil wound around a coil bobbin.

If a conventional coil comprising a conductive wire of circular cross section is wound around a coil bobbin, as shown in FIG. 31, then the coil is subject to forces tending to cause the coil to collapse toward a flange under the tension of the wound coil. The coil 32 of square cross section according to the present embodiment has its turns held in surface-to-surface contact with each other and is not subject to forces tending to cause the coil 32 to collapse toward the flange 28a, 28b. Consequently, one of the flanges 28a or 28b may be dispensed with.

Figure 8:
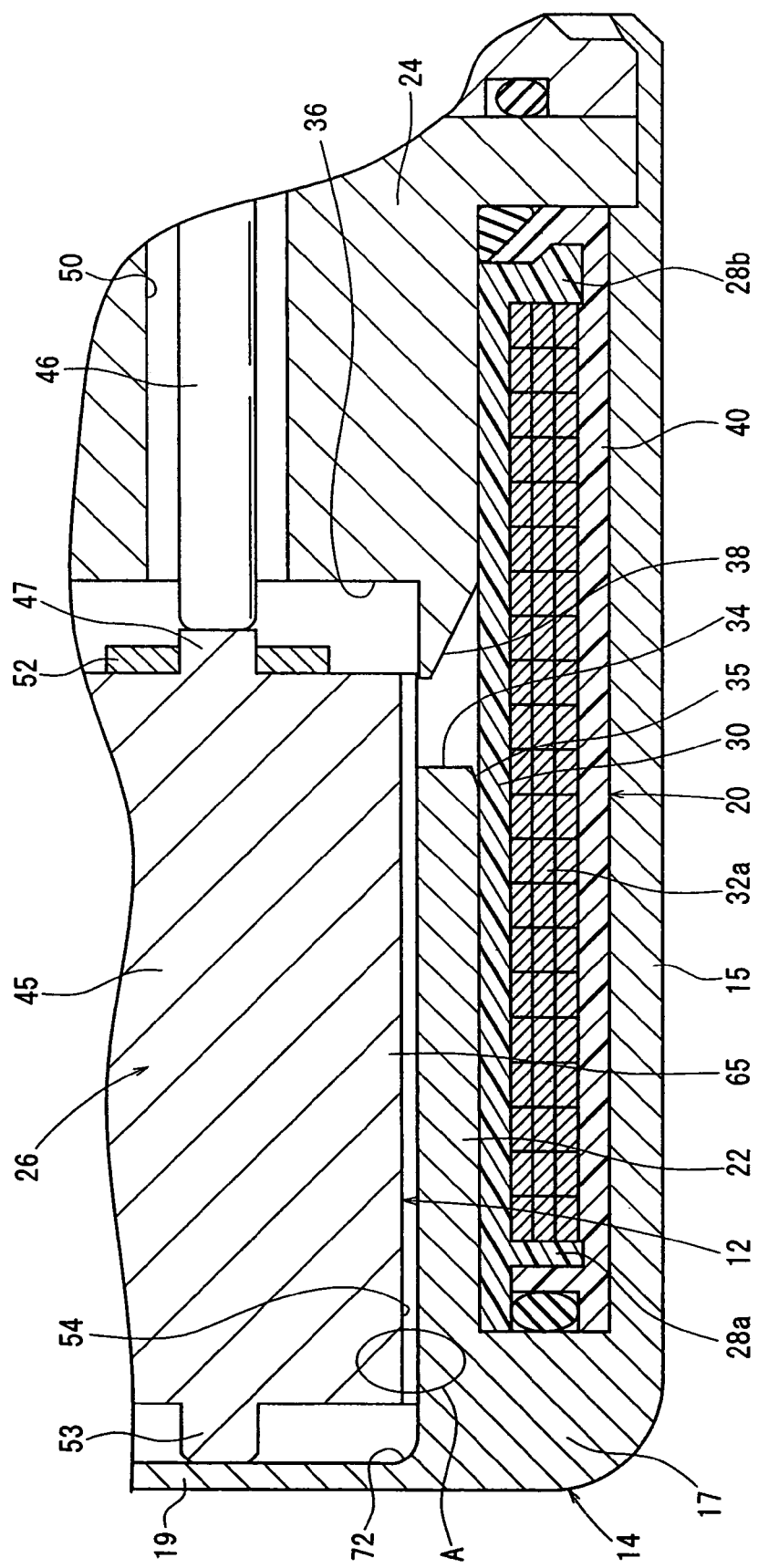
FIG. 8 is an enlarged fragmentary longitudinal cross-sectional view of a modification of the coil assembly shown in FIG. 5.
Figure 9:
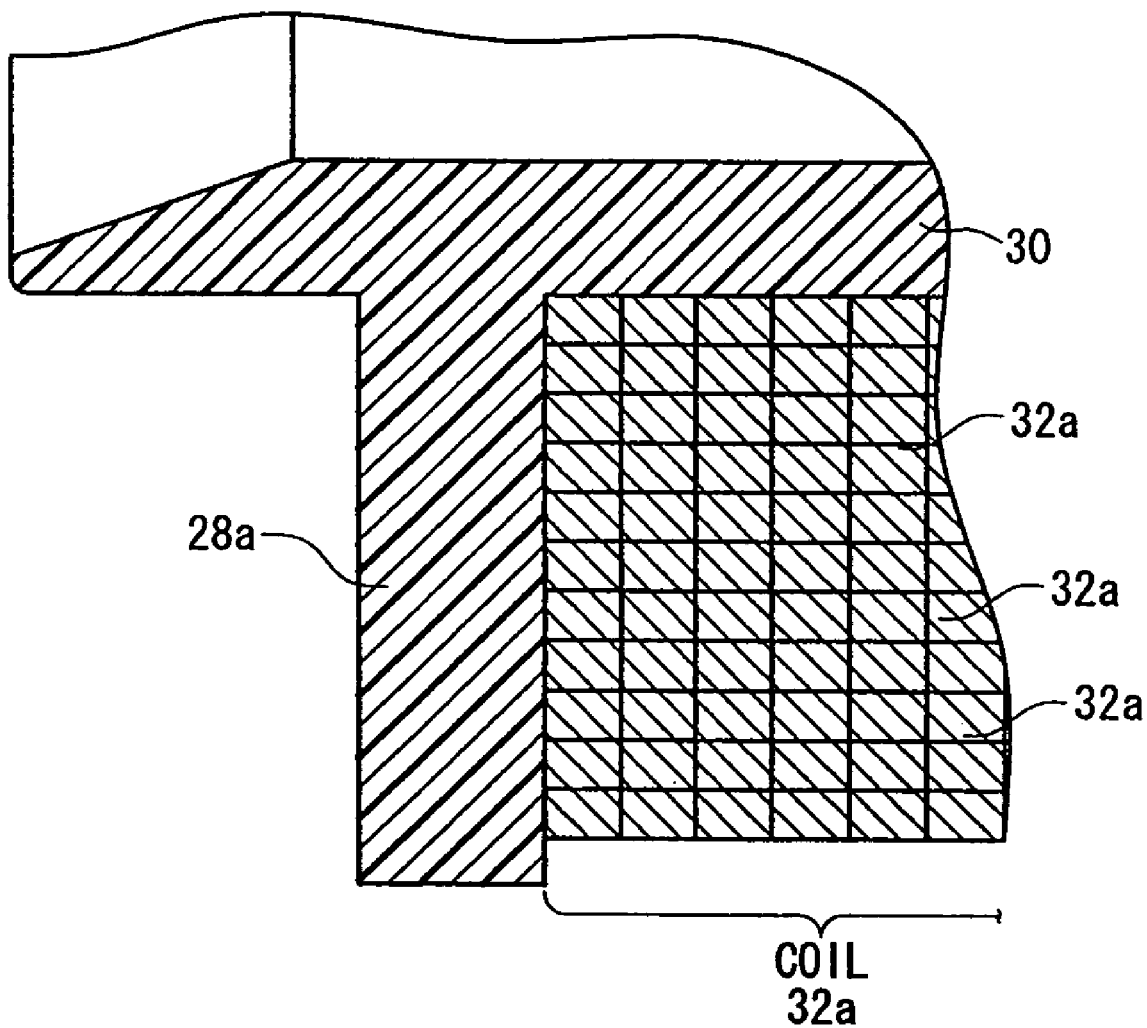
FIG. 9 is an enlarged fragmentary longitudinal cross-sectional view of a coil having a wire of elongate rectangular cross section which is wound around a coil bobbin.

As shown in FIGS. 8 and 9, the solenoid 12 may have a coil 32a comprising a flat conductive wire of elongate rectangular cross section. However, the coil 32 of square cross section can be wound in a smaller space than the coil 32a of elongate rectangular cross section. Furthermore, since the coil 32 of square cross section has a smaller cross-sectional circumferential dimension than the coil 32a of elongate rectangular cross section, the cross-sectional area of an insulating film on the coil 32 may be set to a small value.

As shown in FIG. 5, the yoke 22 has an annular flat surface 34 on the right end thereof which faces the fixed core 24, and the fixed core 24 has an annular conical surface 38 on the left end thereof which faces the yoke 22. The annular flat surface 34 lies perpendicularly to the axis of the yoke 22, and the annular conical surface 38 extends on the outer circumferential surface of the fixed core 24 around a recess 36 defined in the fixed core 24. The yoke 22 also has a tapered surface 35 formed on an end face thereof adjacent to the annular flat surface 34 as a circumferentially beveled surface for reducing a flux leakage.

The tubular yoke 22 and the recess 36 defined in the fixed core 24 are complementary in shape to the movable core 26, providing a linear solenoid structure in which the movable core 26 is slidable between the tubular yoke 22 and the recess 36 defined in the fixed core 24.

Figure 10:
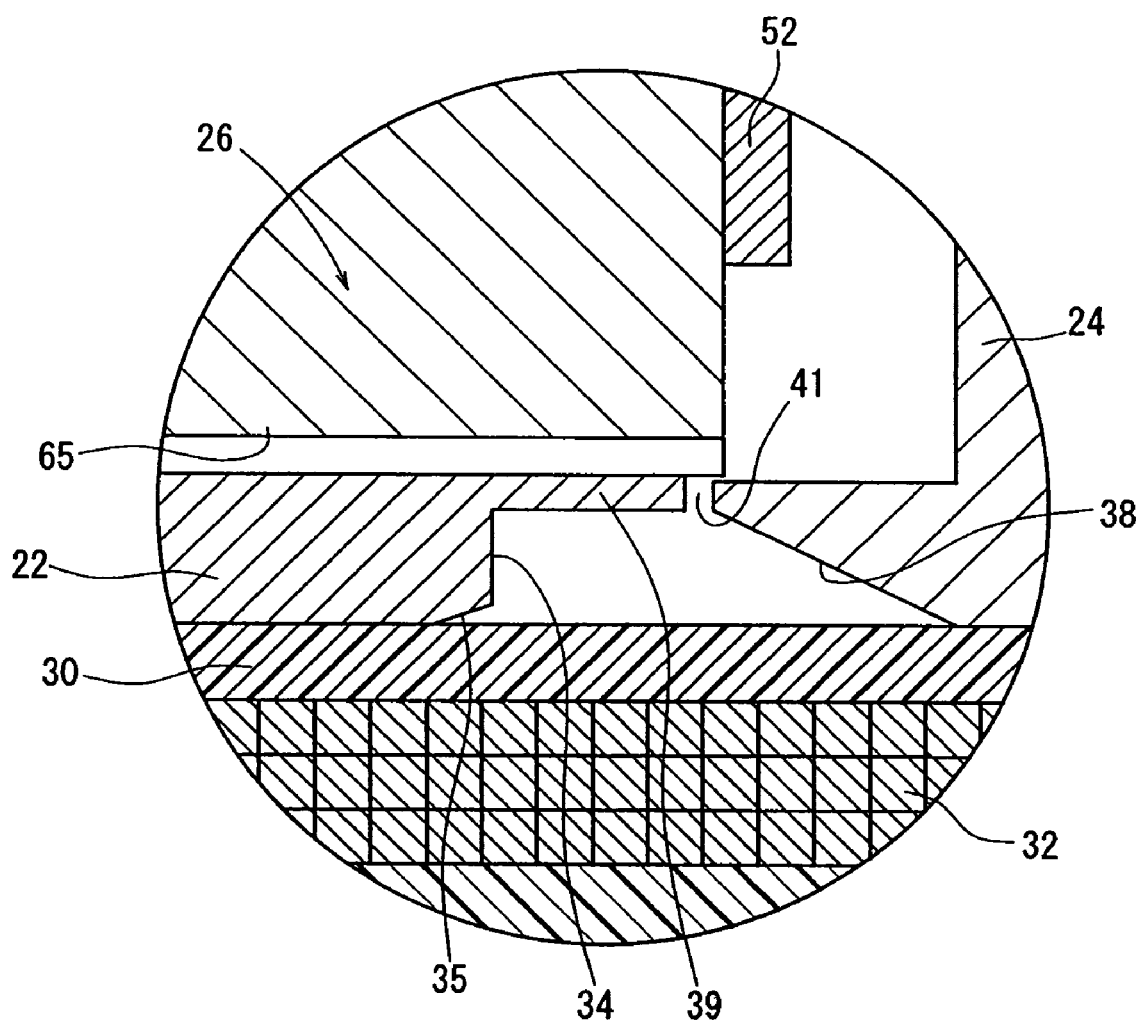
FIG. 10 is an enlarged fragmentary longitudinal cross-sectional view showing an annular guide disposed on an end of a yoke.

As shown in FIG. 10, a thin-walled annular guide 39 projecting a predetermined distance toward the conical surface 38 of the fixed core 24 may be disposed on the flat surface 34 of the yoke 22 which axially confronts the conical surface 38 of the fixed core 24.

In the structure shown in FIG. 10, a gap 41 is present as a clearance between the annular guide 39 and the conical surface 38 of the fixed core 24. The thin-walled annular guide 39 on the yoke 22 is effective to guide the movable core 26 stably for better linear movement with respect to the fixed core 24.

As shown in FIG. 5, a synthetic resin sealing body 40 which is molded over the outer circumferential surface of the coil 32 and a portion of the coil bobbin 30 is disposed between the housing 14 and the coil 32. The synthetic resin sealing body 40 is molded of a synthetic resin material integrally with a coupler 42. The coupler 42 has a terminal 44 electrically connected to the coil 32 and having an exposed terminal end 44a that is electrically connected to a power supply (see FIGS. 1 and 2).

The coil 32 has its outer circumferential surface covered with the synthetic resin sealing body 40 for being stably protected. If one of the flanges 28a (28b) on the ends of the coil bobbin 30 is dispensed with, then the portion of the coil bobbin 30 which lacks the flange 28a (28b) is also covered with the synthetic resin sealing body 40 for protecting the coil 32 more stably.

As shown in FIGS. 1 and 2, the movable core 26 comprises a cylindrical movable core body 45, an boss 47 formed integrally with the central region of an end of the movable core body 45 and projecting a predetermined distance toward the fixed core 24, and a protrusion 53 formed integrally with the central region of the opposite end of the movable core body 45 and projecting a predetermined distance toward the thin-walled region 19 of the housing 14.

A ring 52 is mounted on the outer circumferential surface of the boss 47. The ring 52 is made of a nonmagnetic material and functions as a spacer for preventing residual magnetism from being produced in the solenoid 12.

Specifically, when the solenoid 12 is de-energized, residual magnetism may be produced in the fixed core 24 or the movable core 26, tending to keep the movable core 26 attracted to the fixed core 24. However, the nonmagnetic ring 52 disposed on the end face of the movable core 26 and mounted on the boss 47 forms a certain clearance between the movable core 26 and the fixed core 24, thereby preventing residual magnetism from being produced.

The protrusion 53 projects integrally axially from the center of the other end of the movable core body 45. The protrusion 53 functions as a stopper for abutment against the thin-walled region 19 of the bottom 17 of the housing 14. The protrusion 53 is formed as part of a nonmagnetic layer 65 (described below), and functions as a spacer for preventing residual magnetism from being produced in the solenoid 12. The movable core body 45 has axial communication grooves 54 defined in its outer circumferential surface and providing communication between the opposite ends of the movable core body 45.

Figure 3:
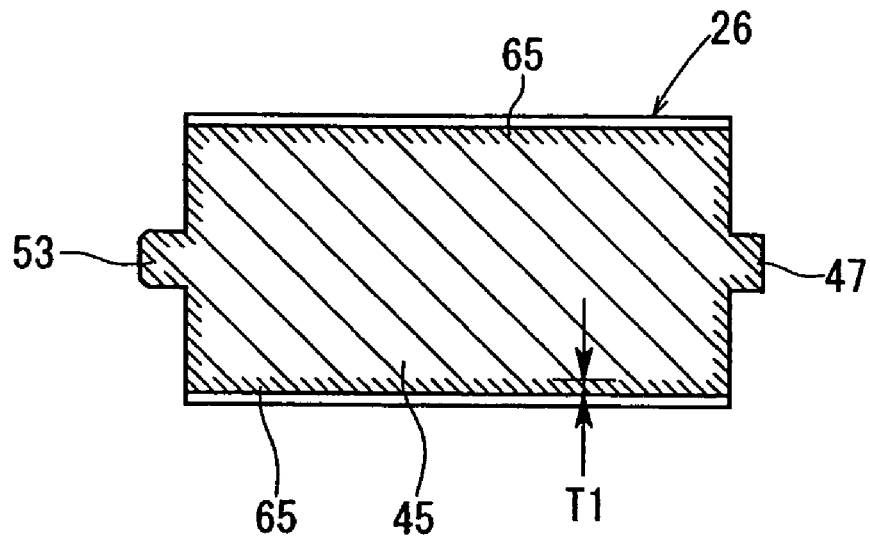
FIG. 3 is an enlarged longitudinal cross-sectional view of a movable core shown in FIG. 1, which has a thin nonmagnetic layer disposed on an entire outer surface thereof.
Figure 4:
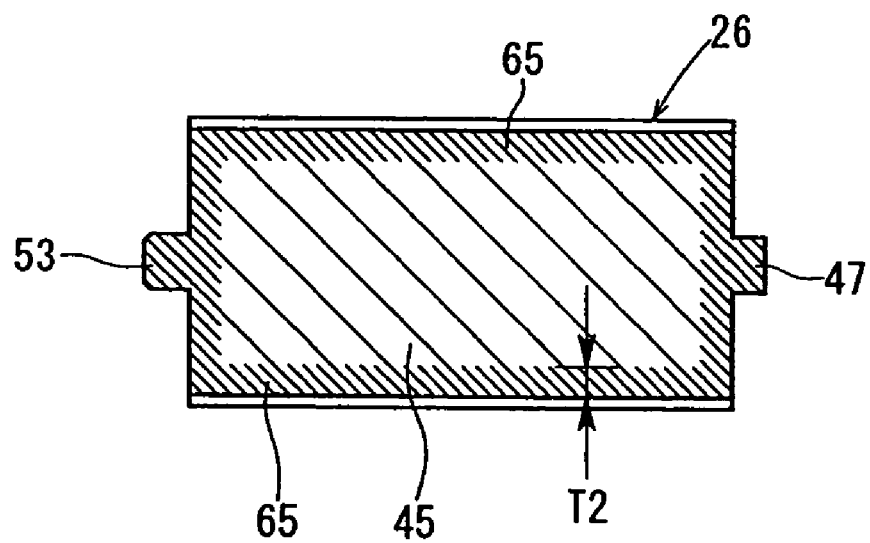
FIG. 4 is an enlarged longitudinal cross-sectional view of a movable core shown in FIG. 1, which has a thick nonmagnetic layer disposed on an entire outer surface thereof.

The movable core 26 has the nonmagnetic layer 65 on its entire outer surface, the nonmagnetic layer 65 having a predetermined depth (see FIGS. 3 and 4).

The nonmagnetic layer 65 of the movable core 26 is formed by a surface reforming process such as a carburizing process and/or a nitriding process. The carburizing process and the nitriding process are advantageous in that they prevent the movable core 26 from changing dimensions and make any subsequent processes unnecessary because they can improve the magnetic permeability of the movable core 26 at a relatively low temperature.

The carburizing process may be a solid carburizing process, a liquid carburizing process (carbonitriding process), a gas carburizing process, a plasma carburizing process, or the like. The nitriding process may be a gas nitriding process, a liquid nitriding process (salt bath nitriding process), a soft nitriding process, an ion nitriding process, or the like.

Alternatively, the nonmagnetic layer 65 may be formed on the outer surface of the movable core 26 by a high-frequency induction hardening process, for example. If the nonmagnetic layer 65 is formed by a high-frequency induction hardening process, then the movable core 26 can be heat-treated at a high speed, and hence can be produced in a shortened manufacturing process. The process of forming the nonmagnetic layer 65 on the outer surface of the movable core 26 is not limited to the surface reforming process such as the carburizing process, the nitriding process, or the high-frequency induction hardening process. The nonmagnetic layer 65 may be formed on the outer surface of the movable core 26 by another surface reforming process such as a laser beam applying process.

The movable core 26 may be made of ferrite-base stainless steel such as SUS410L, SUS405 (JIS), or the like, general steel such as S10C (JIS) or the like, or free cutting steel such as SUM (JIS) or the like.

As shown in FIG. 3, if the nonmagnetic layer 65 formed on the outer surface of the movable core 26 is a thin layer, then the thickness T1 of the nonmagnetic layer 65 may be in the range from 10 µm to 30 µm, or preferably 20 µm. With the thin nonmagnetic layer 65, the magnetic gap produced between the movable core 26 and the yoke 22 can be greatly reduced for increased magnetic forces and hence large attractive force. Therefore, according to the first embodiment, the movable core 26 may be smaller in size than a movable core which is cable of producing the same attractive forces.

As shown in FIG. 4, if the nonmagnetic layer 65 formed on the outer surface of the movable core 26 is a thick layer, then the thickness T2 of the nonmagnetic layer 65 may be in the range from 50 µm to 100 µm, or preferably 75 µm. With the thick nonmagnetic layer 65, the magnetic gap produced between the movable core 26 and the yoke 22 can be increased for suppressing side forces acting between the movable core 26 and the yoke 22. If the movable core 26 with the thick nonmagnetic layer 65 is incorporated in a linear solenoid whose hysteresis increases with the side forces, then the linear solenoid has low hysteresis.

The magnetic material which the movable core 26 is made of may contain 12 weight % or less of Cr for increased durability.

As shown in FIGS. 3 and 4, the boss 47 and the protrusion 53 are formed integrally with the movable core body 45. However, a shaft (not shown) separate from the movable core body 45 may be fitted in a through hole (not shown) defined axially in the movable core body 45, and the shaft may have an end projecting a predetermined distance from an end face of the movable core body 45, providing the boss 47, with the other end of the shaft projecting a predetermined distance from the other end face of the movable core body 45, providing the protrusion 53.

The fixed core 24 has a through hole 50 defined centrally axially therethrough, with a shaft 46 of a spool valve 66 (described later) extending through the through hole 50.

The valve mechanism 16 has the valve body 18 having an inlet port 56, an outlet port 58, a drain port 60, and a breather port 62 communicating with an oil tank (not shown), defined in a side wall thereof, and a spool valve (valve element) 66 axially displaceably disposed in a space 64 defined in the valve body 18.

The spool valve 66 has a first land 66a, a second land 66b, and a third land 66c which are positioned successively from the solenoid 12. The first land 66a and the second land 66b are of the same diameter, and the third land 66c is slightly smaller in diameter than the first land 66a and the second land 66b.

The space 64 in the valve body 18 is closed by an end block 68 disposed in the end of the valve body 18 remote from the solenoid 12. A return spring 70 for normally pressing the spool valve 66 toward the solenoid 12 is disposed between the end block 68 and the spool valve 66. The return spring 70 is illustrated as being a helical spring. However, the return spring 70 is not limited to a helical spring, but may be another resilient member such as a leaf spring or the like.

The spool valve 66 integrally has a shaft 46 on an end thereof facing the solenoid 12 and held in abutting engagement with the end face of the boss 47 of the movable core 26. The spring force of the return spring 70 acts through the spool valve 66 and the shaft 46 on the movable core 26, pressing the movable core 26 axially in the direction indicated by the arrow X1 in FIG. 1.

The hydraulic control valve 10 according to the first embodiment is basically constructed as described above. Operation and advantages of the hydraulic control valve 10 will be described below.

When the solenoid 12 is de-energized, the spool valve 66 is pressed axially in the direction indicated by the arrow X1 in FIG. 1 under the spring force (pressing force) of the return spring 70, holding the inlet port 56 and the outlet port 58 out of communication with each other.

Figure 11:
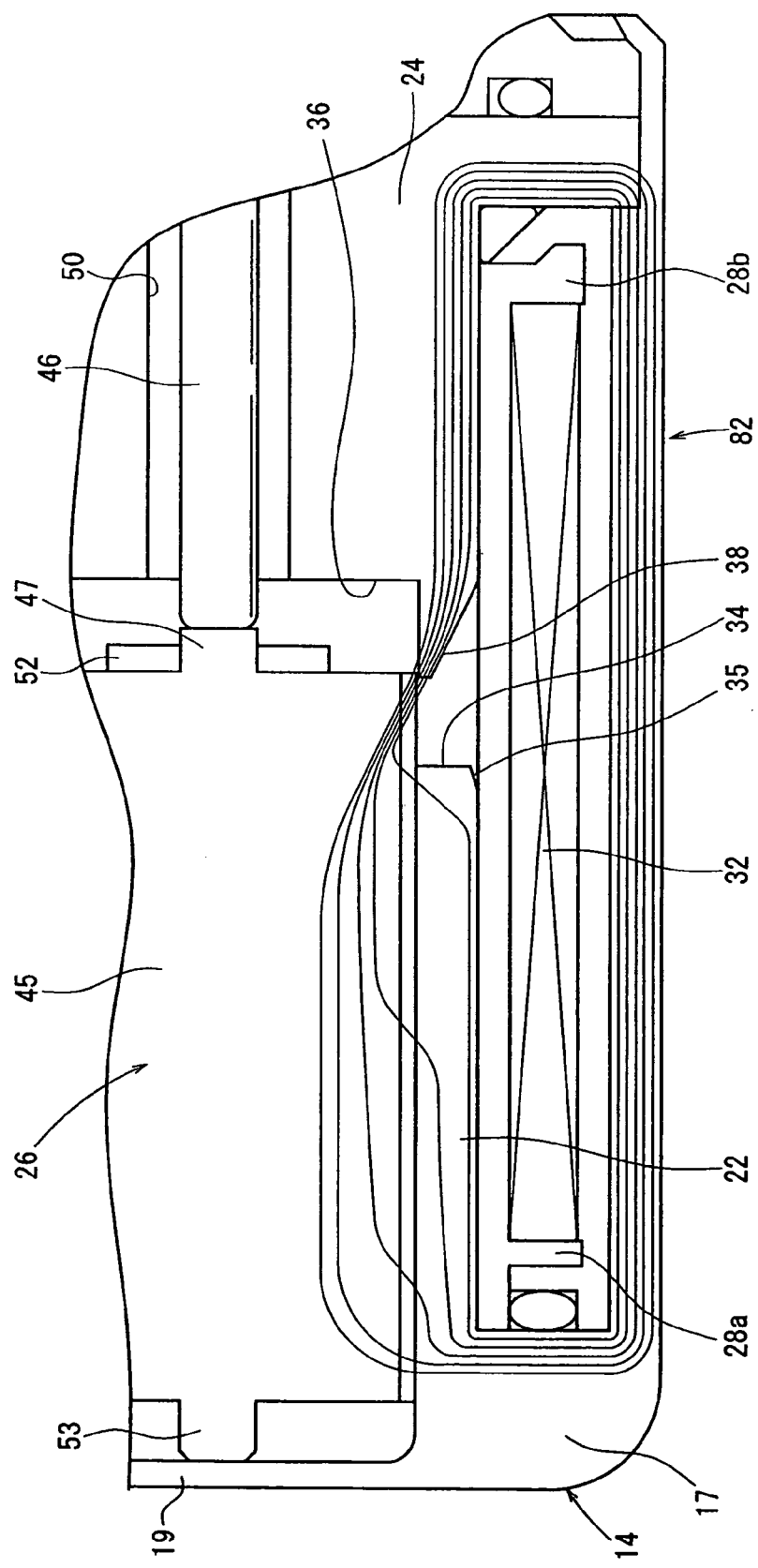
FIG. 11 is an enlarged fragmentary view showing a magnetic circuit of the solenoid.
Figure 12:
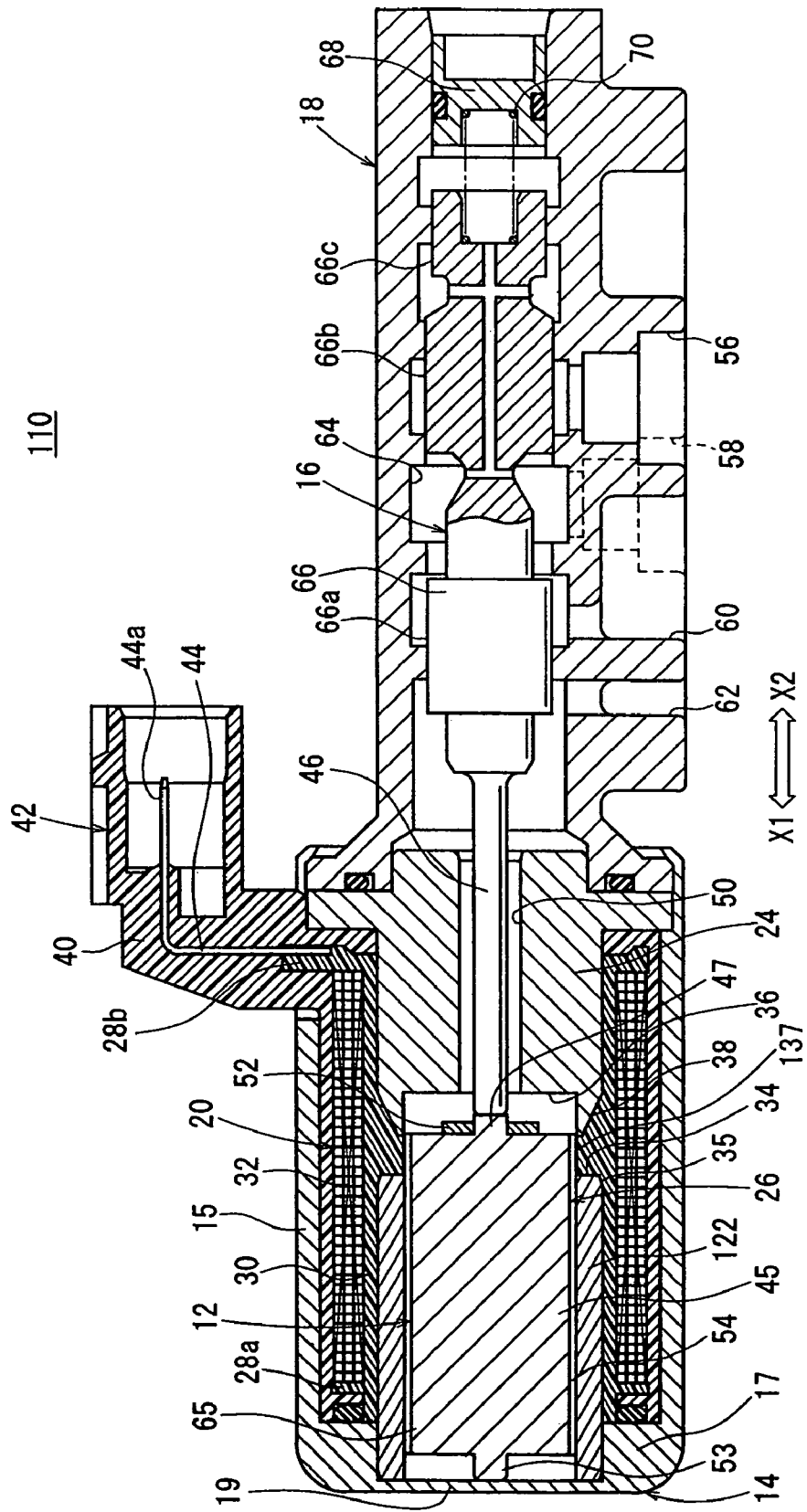
FIG. 12 is a longitudinal cross-sectional view of a hydraulic control valve according to a second embodiment of the present invention, taken along an axial direction thereof.
Figure 13:
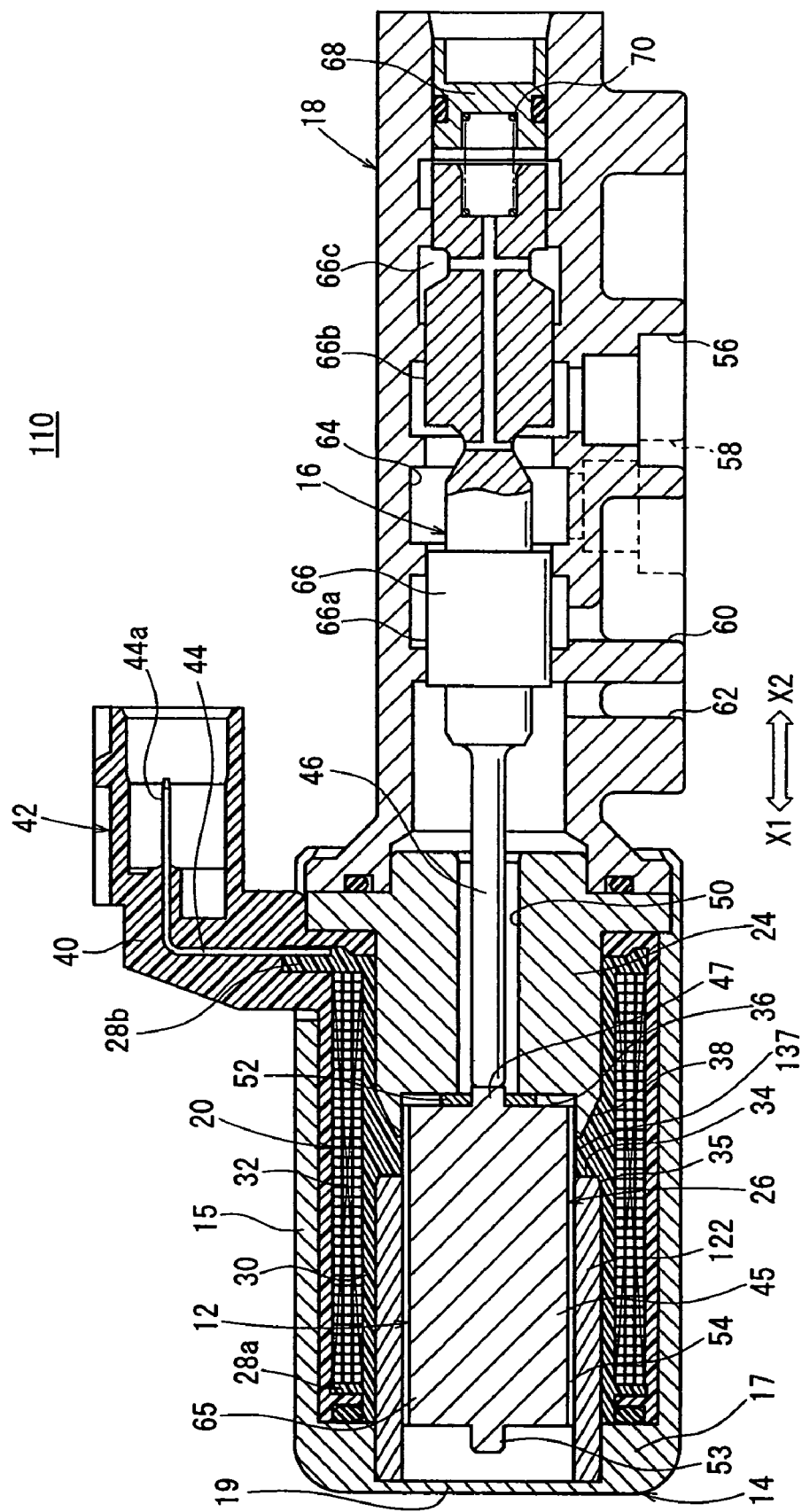
FIG. 13 is a longitudinal cross-sectional view of the hydraulic control valve, showing a spool valve displaced when a solenoid of the hydraulic control valve shown in FIG. 12 is energized.

When the non-illustrated power supply is turned on, the coil 32 of the solenoid 12 is energized, causing a magnetic circuit 82 as shown in FIG. 11 to generate an electromagnetic force. At this time, the generated electromagnetic force is proportional to the amount of current supplied to the coil 32, and is applied to the movable core 26. Under the generated electromagnetic force, the shaft 46 and hence the spool valve 66 are axially displaced in the direction indicated by the arrow X2 in FIG. 1 against the bias of the return spring 70. The drain port 60 and the outlet port 58 are brought out of communication with each other, and the inlet port 56 and the outlet port 58 are brought into communication with each other (see FIG. 2).

Oil which is supplied under pressure from an oil source (not shown) through a passageway (not shown) flows through the inlet port 56 and the outlet port 58 and is supplied to a hydraulic device (not shown). When the solenoid 12 is de-energized, the spool valve 66 returns to the initial position shown in FIG. 1 under the bias of the return spring 70.

In the first embodiment, since the nonmagnetic layer 65 is formed on the entire outer surface of the movable core 26 by the surface reforming process, the nonmagnetic layer 65 functions as a magnetic gap in the magnetic circuit 82 that is made when the coil 32 is energized.

As the nonmagnetic layer 65 is formed on the entire outer surface of the movable core 26, the movable core 26 can easily be formed to desired dimensions by simply managing the outside diameter of the movable core 26. Therefore, a magnetic gap provided by the clearance between the yoke 22 and the movable core 26 can be managed with accuracy for better magnetic characteristics.

Because of the nonmagnetic layer 65 formed on the entire outer surface of the movable core 26, the movable core 26 is prevented from sticking to the inner wall surface of the yoke 22. In addition, the hydraulic control valve 10 is not required to have a separate nonmagnetic thin film or member, e.g., a nonmagnetic pipe, which would otherwise be used between the movable core 26 and the yoke 22.

Since such a separate nonmagnetic thin film is not necessary, there is no need to manage the thickness of the nonmagnetic thin film which would otherwise tend to affect the outside diameter of the movable core 26. The nonmagnetic layer 65 is not liable to be peeled off, swell, and cause surface irregularities and pinholes, making the movable core 26 high in durability and good in quality.

The nonmagnetic layer 65 formed on the entire outer surface of the movable core 26 may be made thin or thick for adjusting the size of the magnetic gap (the clearance between the outer circumferential surface of the movable core 26 and the inner wall surface of the yoke 22). As a result, it is possible to produce desired attractive forces depending on the size of the magnetic gap. If the magnetic gap is minimized insofar as the slidability between the movable core 26 and the yoke 22 is maintained, then the movable core 26 is prevented from being tilted as it is displaced toward the fixed core 24, resulting in stable magnetic characteristics.

In the first embodiment, furthermore, the coil 32 wound around the coil bobbin 30 of the solenoid 12 is of square cross section, thereby minimizing any gaps between stacked turns of the coil 32. Therefore, the total cross-sectional area of the coil 32, i.e., the overall space occupied by the coil 32 wound around the coil bobbin 30, is smaller than that of the conventional solenoid coil of circular cross section which has the same number of turns as the coil 32.

Stated otherwise, the ratio of the cross-sectional area of the conductor of the coil 32 to the space in which the coil 32 is wound, i.e., the conductor occupation ratio, may be greater than that of the solenoid coil of circular cross section.

Since the space in which the coil 32 is wound can be reduced, the coil bobbin 30 can be reduced in size, resulting in a reduction in the overall size of the solenoid 12.

If the space in which the coil 32 is wound is the same as the space in which the solenoid coil of circular cross section is wound, then the number of turns of the coil 32 of square cross section on the coil bobbin 30 is greater than that of the solenoid coil of circular cross section. Accordingly, the solenoid 12 can produce greater attractive forces (electromagnetic forces) than the solenoid coil of circular cross section.

In the first embodiment, since the space in which the coil 32 is wound can be reduced, the total dimension (total length) of the continuous wire of the coil 32 can be reduced, and hence the resistance of the coil 32 can be reduced. As a result, the electric power consumed when the coil 32 is energized can be reduced.

If the coil 32 of square cross section has the same resistance as the solenoid coil of circular cross section, then the number of turns of the coil 32 wound around the coil bobbin 30 is increased in the first embodiment for producing increased attractive forces (electromagnetic forces).

In the first embodiment, inasmuch as the coil 32 of square cross section has its turns held in surface-to-surface contact with each other, the conductor occupation ratio in the space in which the coil 32 is wound is greater than the conductor occupation ratio in the space in which the coil of circular cross section is wound.

Consequently, any gaps between stacked turns of the coil 32 can be minimized for increasing the density of turns of the coil 32 per unit volume in the space in which the coil 32 is wound. As a result, the heat transfer capability (heat radiation capability) in the space in which the coil 32 is wound is increased. If the present invention is applied to an electromagnetic valve for use in an environment where the atmospheric temperature is lower than the temperature to which the coil is heated, then since the heat radiation capability can be increased and the resistance of the coil 32 can be reduced, the amount of heat generated by the coil 32 when it is energized is reduced. Therefore, the resistance of the coil 32 can further be reduced.

The solenoid 12 including the coil 32 of square cross section can be used in an electromagnetic valve for use on vehicles. Generally, there is a minimum battery voltage of 8 V, for example, to be applied to electric parts for use on vehicles. Since electromagnetic valves for use on vehicles are required to maintain a minimum magnetomotive force (current value), the maximum resistance that the electromagnetic valves should have are necessarily determined if the same magnetic circuit is employed. Because the resistance of the coil 32 generally increases as the temperature thereof increases, the maximum resistance has to be of a value taking into account the temperature-dependent resistance increase. If the maximum resistance is set without taking into account the temperature-dependent resistance increase, then the electromagnetic valve may not have a required current and may not possibly obtain a minimum magnetomotive force. Therefore, if the solenoid 12 is used in an electromagnetic valve for use on vehicles, then it is required to maintain a desired magnetomotive force (current value) though the resistance of the coil 32 increases due to an increase in the temperature of coil 32 when the solenoid 12 is energized.

If the resistance of the coil 32 itself and the resistance of the coil 32 when it is heated upon energization are low, then they are highly advantageous because the coil 32 can maintain a high current value according to the Ohm's law. With the coil 32 being of square cross section, if the solenoid 12 can produce the same magnetomotive force as conventional solenoids, then the resistance of coil 32 is made smaller and the coil 32 consumes a lower amount of electric power, which reduces the amount of heat generated by the coil 32 when it is energized, resulting in a reduction in the resistance of the coil 32 at the time it is energized and heated.

As a result, the resistance of the coil 32 at the time it is energized and heated can be reduced to allow an increased current to pass through the coil 32. Therefore, the solenoid 12 can appropriately be used in an electromagnetic valve for which a minimum applied voltage is limited. Furthermore, since the current value of the solenoid 12 having the coil 32 of square cross section is made higher than that of the conventional solenoid having the coil of circular cross section and producing the same minimum magnetomotive force, the number of turns of the coil 32 around the coil bobbin 30 is made smaller, and hence the coil 32 is made smaller in size.

In the first embodiment, the protrusion 53 which functions as a stopper is disposed on the end face of the movable core 26 which faces the thin-walled region 19 of the housing 14. The protrusion 53 can also function as a spacer (so-called magnet killer) for preventing residual magnetism from being generated in the solenoid 12.

Specifically, magnetic fluxes are less liable to flow into the thin-walled region 19 of the housing 14, and less liable to flow into the central area of the thin-walled region 19. With the protrusion 53 being disposed centrally on the end face of the movable core 26 which faces the center of the thin-wall region 19, magnetic fluxes are prevented from flowing into the protrusion 53.

The protrusion 53 on the end face of the movable core 26 allows a curved edge 72 (see FIG. 5) to be formed on the inner wall at the bottom of the housing 14 which is engaged by the protrusion 53. Because of the curved edge 72, the housing 14 can be manufactured with ease.

The end face of the movable core 26 which has the protrusion 53 thereon faces the wall surface of the thin-walled region 19 with the protrusion 53 interposed therebetween. Therefore, magnetic fluxes are prevented from flowing from the thin-walled region 19 of the housing 14 into the end face of the movable core 26.

In the first embodiment, furthermore, the outer circumferential surface of the end of the movable core 26 is disposed between the bottom 17 of the housing 14 and the tubular yoke 22 at a position which corresponds to the inner wall surface of the bottom 17 of the housing 14 (see an encircled portion A in FIG. 5). Therefore, magnetic fluxes that run from the bottom 17 of the housing 14 to the movable core 26 are also transferred between the inner wall surface of the bottom 17 and the outer circumferential surface of the movable core 26 (see FIG. 11). Therefore, magnetic fluxes are smoothly transferred between the bottom 17 of the housing 14 and the end of the movable core 26, so that an increased amount of magnetic fluxes can be generated by the magnetic circuit.

As a result, the solenoid 12 can produce increased attractive forces. If the solenoid 12 is to produce the same attractive forces as a conventional solenoid, then the hydraulic control valve 10 according to the first embodiment can be reduced in overall size.

A hydraulic control valve 110 according to a second embodiment of the present invention is shown in FIGS. 12 through 17. Those parts of the hydraulic control valve 110 according to the second embodiment which are identical to those of the hydraulic control valve 10 according to the first embodiment are denoted by identical reference characters, and will not be described in detail below.

The hydraulic control valve 110 according to the second embodiment has a solenoid 12 including a coil assembly 20 disposed in a housing 14, a tubular yoke 122 disposed in the coil assembly 20 and extending parallel to a hollow cylindrical member 15 of the housing 14, a fixed core 24 joined to an open end of the housing 14 and axially spaced a predetermined clearance from the yoke 122 within the coil assembly 20, and a movable core 26 slidably fitted in the yoke 22 and the fixed core 24.

The yoke 122 is different from the yoke 22 of the hydraulic control valve 10 according to the first embodiment in that the yoke 122 comprises a substantially tubular member separate from the housing 14 and has an axial end press-fitted in and held by an inner wall in a bottom 17 of the housing 14.

The yoke 122 has an annular flat surface 34 on the right end thereof which faces the fixed core 24, and the fixed core 24 has an annular conical surface 38 on the left end thereof which faces the yoke 122. The annular flat surface 34 lies perpendicularly to the axis of the yoke 22, and the annular conical surface 38 extends on the outer circumferential surface of the fixed core 24 around a recess 36 defined in the fixed core 24. The yoke 122 also has a tapered surface 35 formed on an end face thereof adjacent to the annular flat surface 34 as a circumferentially beveled surface for reducing a flux leakage.

The tubular yoke 122 and the recess 36 defined in the fixed core 24 are complementary in shape to the movable core 26, providing a linear solenoid structure in which the movable core 26 is slidable between tubular yoke 122 and the recess 36 defined in the fixed core 24.

Figure 16:
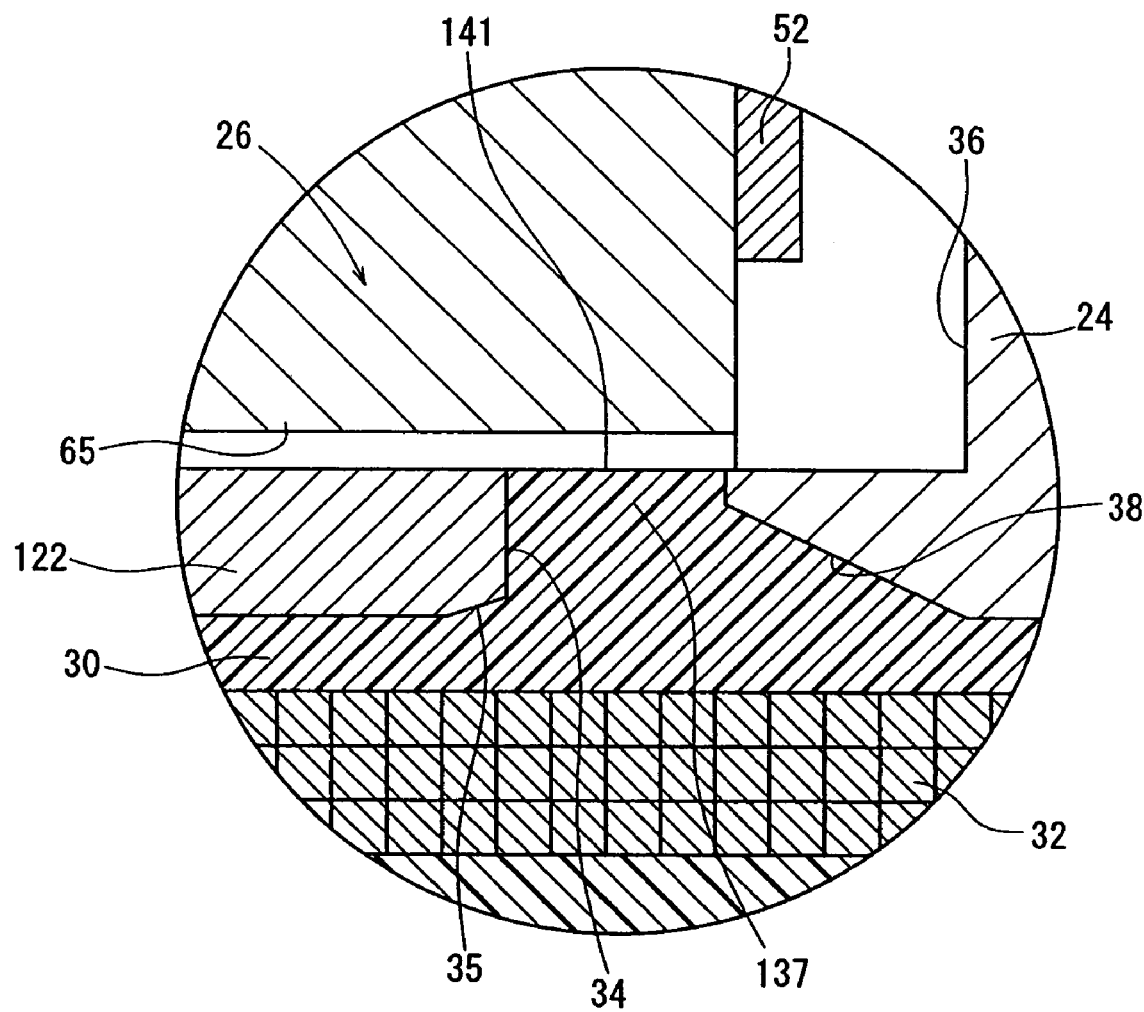
FIG. 16 is an enlarged fragmentary longitudinal cross-sectional view showing a radially inward land of a coil bobbin which is disposed between a yoke and a fixed core.
Figure 17:
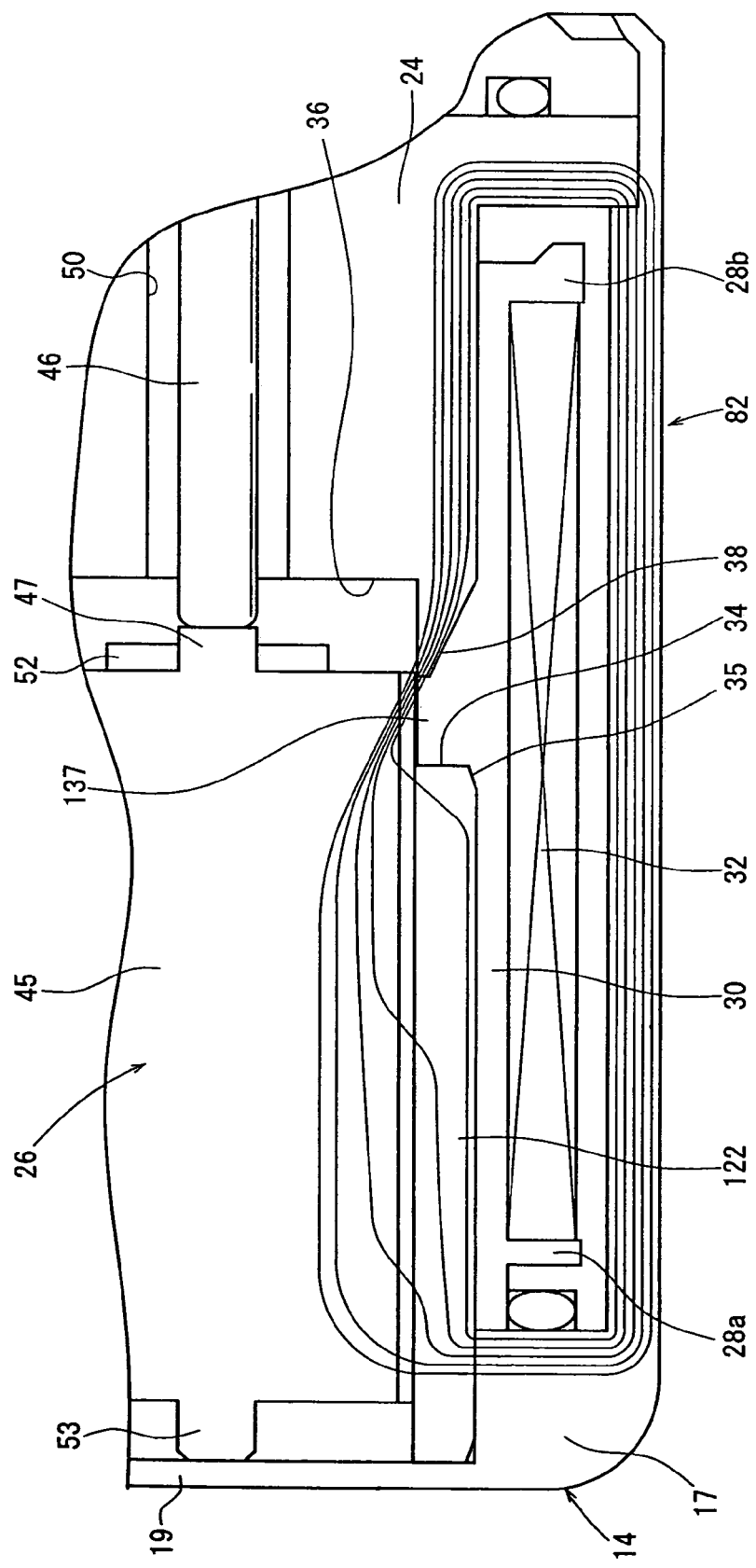
FIG. 17 is an enlarged fragmentary view showing a magnetic circuit of the solenoid.
Figure 18:
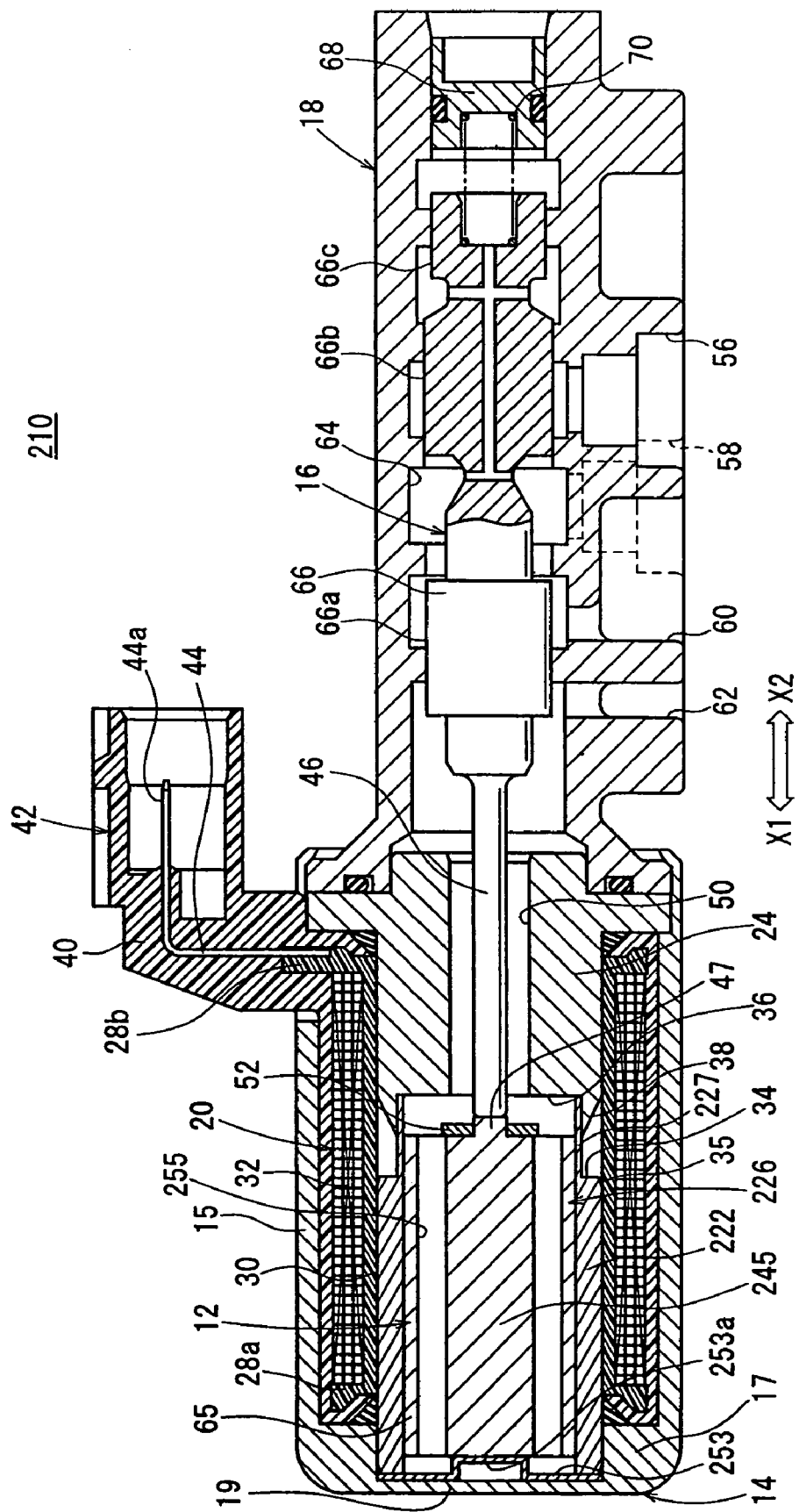
FIG. 18 is a longitudinal cross-sectional view of a hydraulic control valve according to a third embodiment of the present invention, taken along an axial direction thereof.
Figure 19:
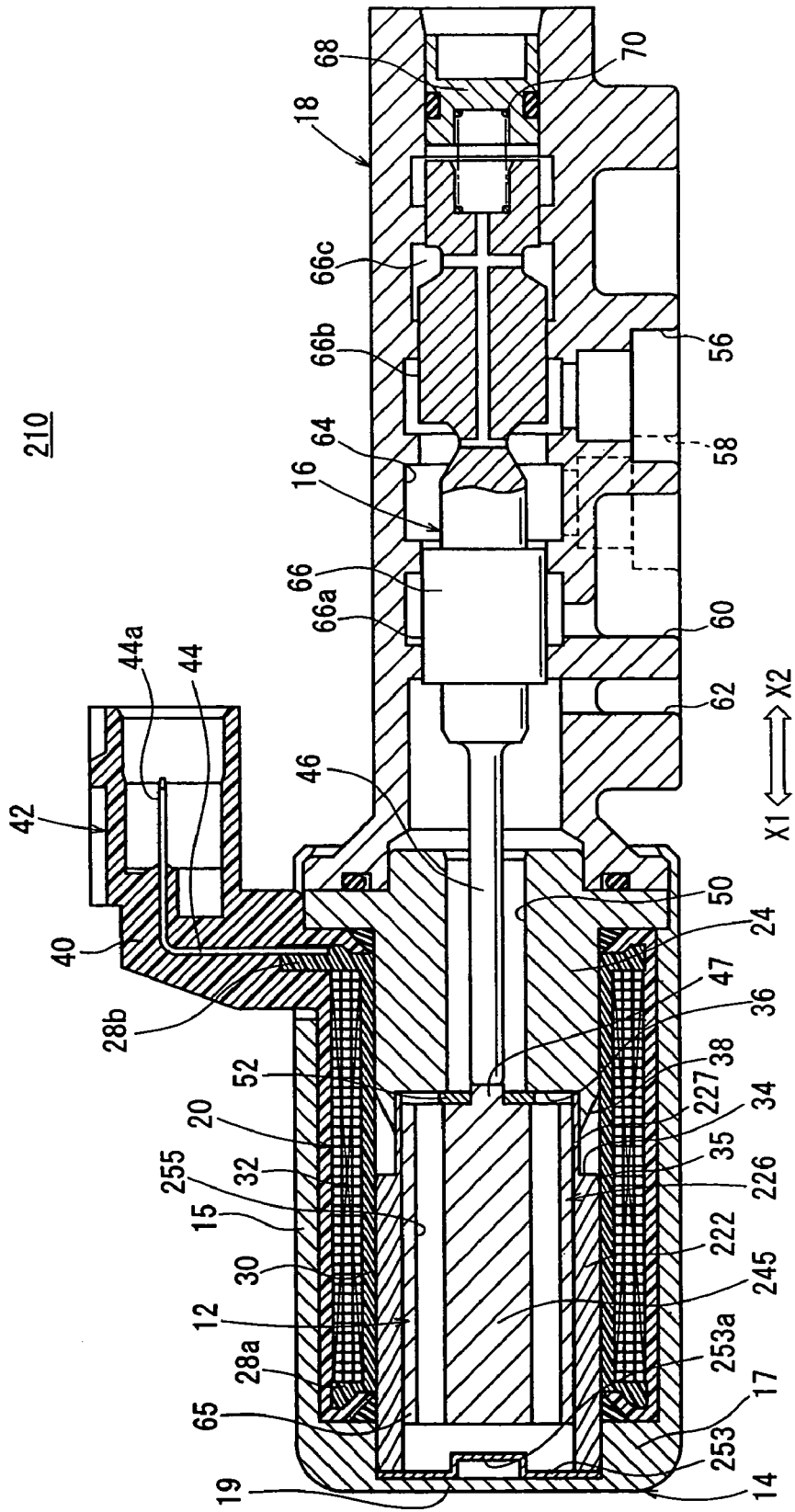
FIG. 19 is a longitudinal cross-sectional view of the hydraulic control valve, showing a spool valve displaced when a solenoid of the hydraulic control valve shown in FIG. 18 is energized.

As shown in FIG. 16, a coil bobbin 30 has a radially inward land (annular land) 137 disposed between the yoke 122 and the fixed core 24. The radially inward land 137 is formed integrally with the coil bobbin 30 and projects a predetermined distance radially inwardly of the coil bobbin 30. Stated otherwise, the axial space between the yoke 122 and the fixed core 24 is closed by the radially inward land 137 that is formed integrally with the coil bobbin 30.

The radially inward land 137 is shaped complementarily to the flat surface 34 of the yoke 122 and the conical surface 38 of the fixed core 24, providing a guide 141 surrounding the outer circumferential surface of the movable core 26 with a predetermined clearance interposed therebetween.

The coil bobbin 30 with the integrally formed radially inward land 137 keeps the yoke 122 and the fixed core 24 highly accurately in coaxial alignment with each other, and allows the yoke 122 and the fixed core 24 to be assembled with greater ease. Specifically, the yoke 122 and the fixed core 24 are held by the inner circumferential surface of the coil bobbin 30, and are held highly accurately in coaxial alignment with each other by the radially inward land 137 which is disposed in the space across which the yoke 122 and the fixed core 24 confront each other.

Since the yoke 122 and the fixed core 24 are kept highly accurately in coaxial alignment with each other, the movable core 26 can smoothly move reciprocally along the inner wall surface of the yoke 122 or the inner circumferential surface of the recess 36 in the fixed core 24, and side forces acting on the movable core 26 are reduced to allow the movable core 26 to move reciprocally smoothly. Therefore, hysteresis is reduced when the movable core 26 moves reciprocally, and the solenoid 12 has good hysteresis characteristics.

The guide 141 disposed around the outer circumferential surface of the movable core 26 with the predetermined clearance interposed therebetween is effective to guide the movable core 26 well for better linear movement.

The hydraulic control valve 110 according to the second embodiment is basically constructed as described above. Only operational details and advantages of the hydraulic control valve 110 which are different from those of the hydraulic control valve 10 according to the first embodiment will be described below.

According to the second embodiment, the radially inward land 137 which is formed integrally with the coil bobbin 30 and projecting the predetermined distance radially inwardly of the coil bobbin 30 is disposed between the yoke 122 and the fixed core 24 (see FIG. 16). The coil bobbin 30 with the integrally formed radially inward land 137 keeps the yoke 122 and the fixed core 24 highly accurately in coaxial alignment with each other, and allows the yoke 122 and the fixed core 24 to be assembled with greater ease.

Specifically, the yoke 122 and the fixed core 24 are held by the inner circumferential surface of the coil bobbin 30, and the radially inward land 137 is disposed in the space across which the yoke 122 and the fixed core 24 confront each other. This structure provides highly accurate coaxial alignment between the yoke 122 and the fixed core 24.

Inasmuch as highly accurate coaxial alignment is maintained between the yoke 122 and the fixed core 24, the movable core 26 can smoothly move reciprocally along the inner wall surface of the yoke 122 or the inner circumferential surface of the recess 36 in the fixed core 24, and side forces acting on the movable core 26 are reduced to allow the movable core 26 to move reciprocally smoothly. Therefore, hysteresis is reduced when the movable core 26 moves reciprocally, and the solenoid 12 has good hysteresis characteristics.

Furthermore, the guide 141 disposed around the outer circumferential surface of the movable core 26 with the predetermined clearance interposed therebetween is effective to guide the movable core 26 well for better linear movement.

Figure 14:
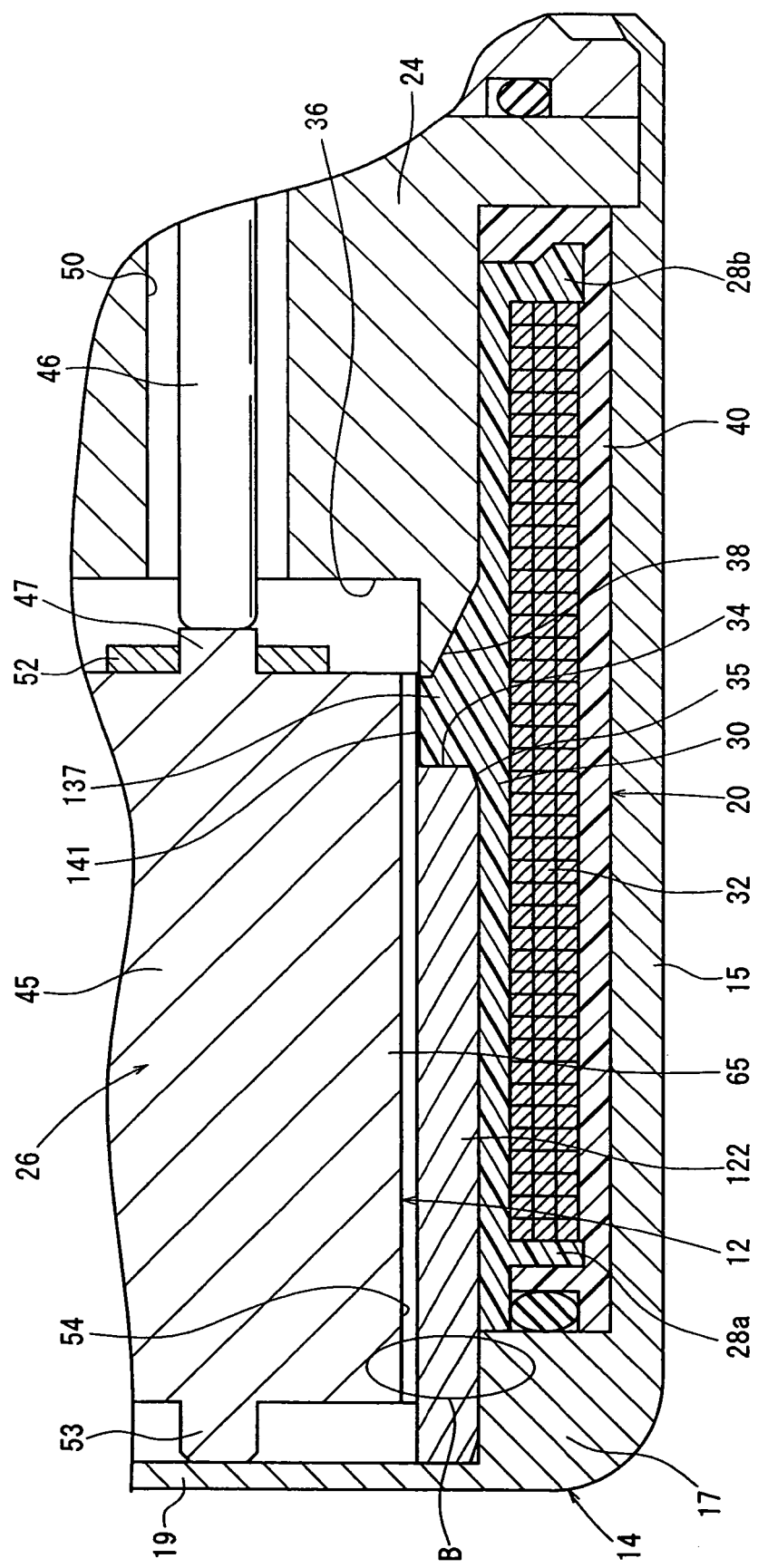
FIG. 14 is an enlarged fragmentary longitudinal cross-sectional view of a coil assembly of the hydraulic control valve shown in FIG. 12.
Figure 15:
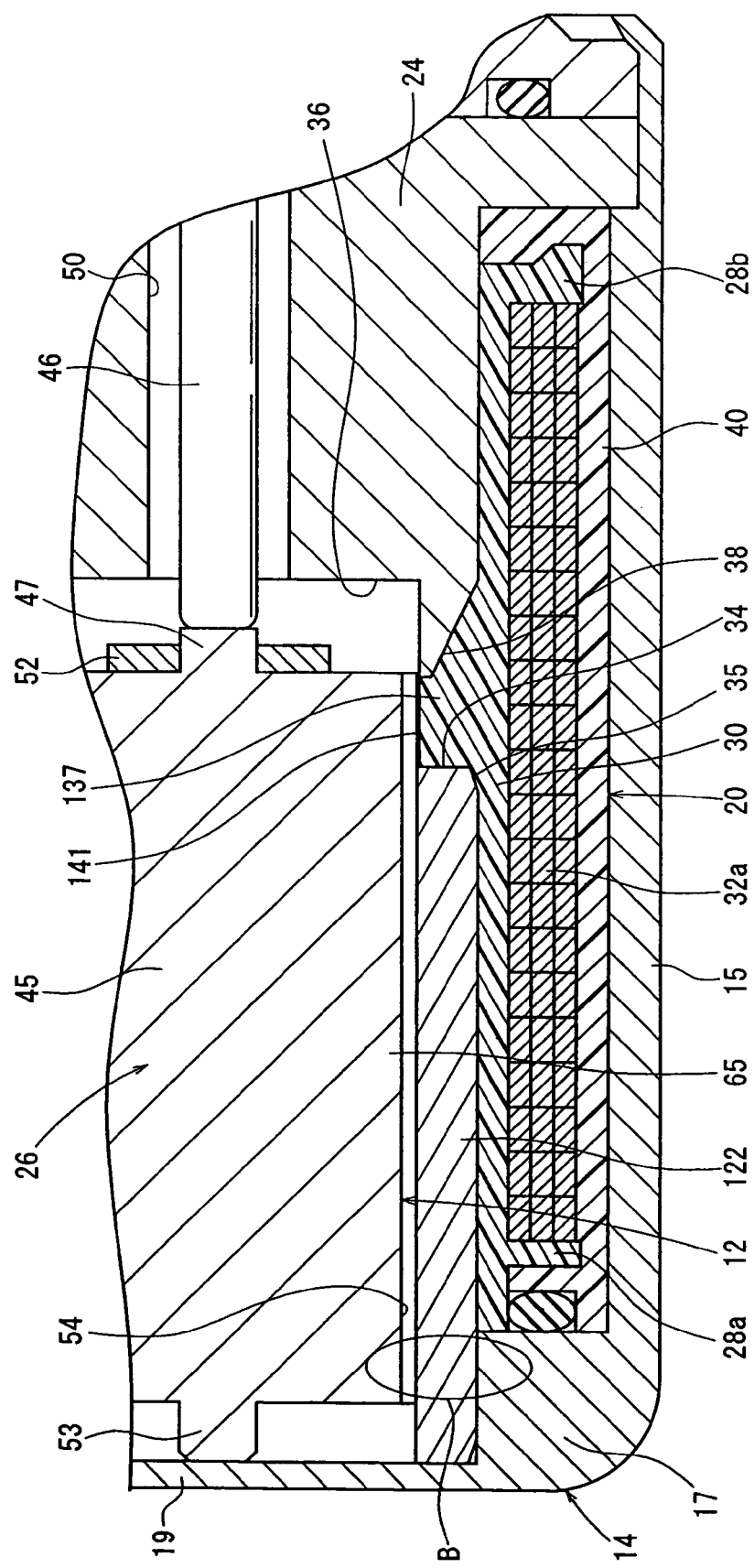
FIG. 15 is an enlarged fragmentary longitudinal cross-sectional view of a modification of the coil assembly shown in FIG. 14.

In the second embodiment, in addition, the outer circumferential surface of the end of the movable core 26 is disposed between the bottom 17 of the housing 14 and the tubular yoke 122 at a position which corresponds to the inner wall surface of the bottom 17 of the housing 14 (see an encircled portion B in FIG. 14). Therefore, magnetic fluxes that run from the bottom 17 of the housing 14 to the movable core 26 are also transferred between the inner wall surface of the bottom 17 and the outer circumferential surface of the movable core 26 (see FIG. 17). Therefore, magnetic fluxes are smoothly transferred between the bottom 17 of the housing 14 and the end of the movable core 26, so that an increased amount of magnetic fluxes can be generated by the magnetic circuit.

As a result, the solenoid 12 can produce increased attractive forces. If the solenoid 12 is to produce the same attractive forces as a conventional solenoid, then the hydraulic control valve 110 according to the second embodiment can be reduced in overall size.

A hydraulic control valve 210 according to a third embodiment of the present invention is shown in FIGS. 18 through 25.

The hydraulic control valve 210 according to the third embodiment has a solenoid 12 including a coil assembly 20 disposed in a housing 14, a tubular yoke 222 disposed in the coil assembly 20 and extending parallel to a hollow cylindrical member 15 of the housing 14, a fixed core 24 joined to an open end of the housing 14 and axially spaced a predetermined clearance from the yoke 222 within the coil assembly 20, and a movable core 226 slidably fitted in the yoke 222 and the fixed core 24.

Figure 22:
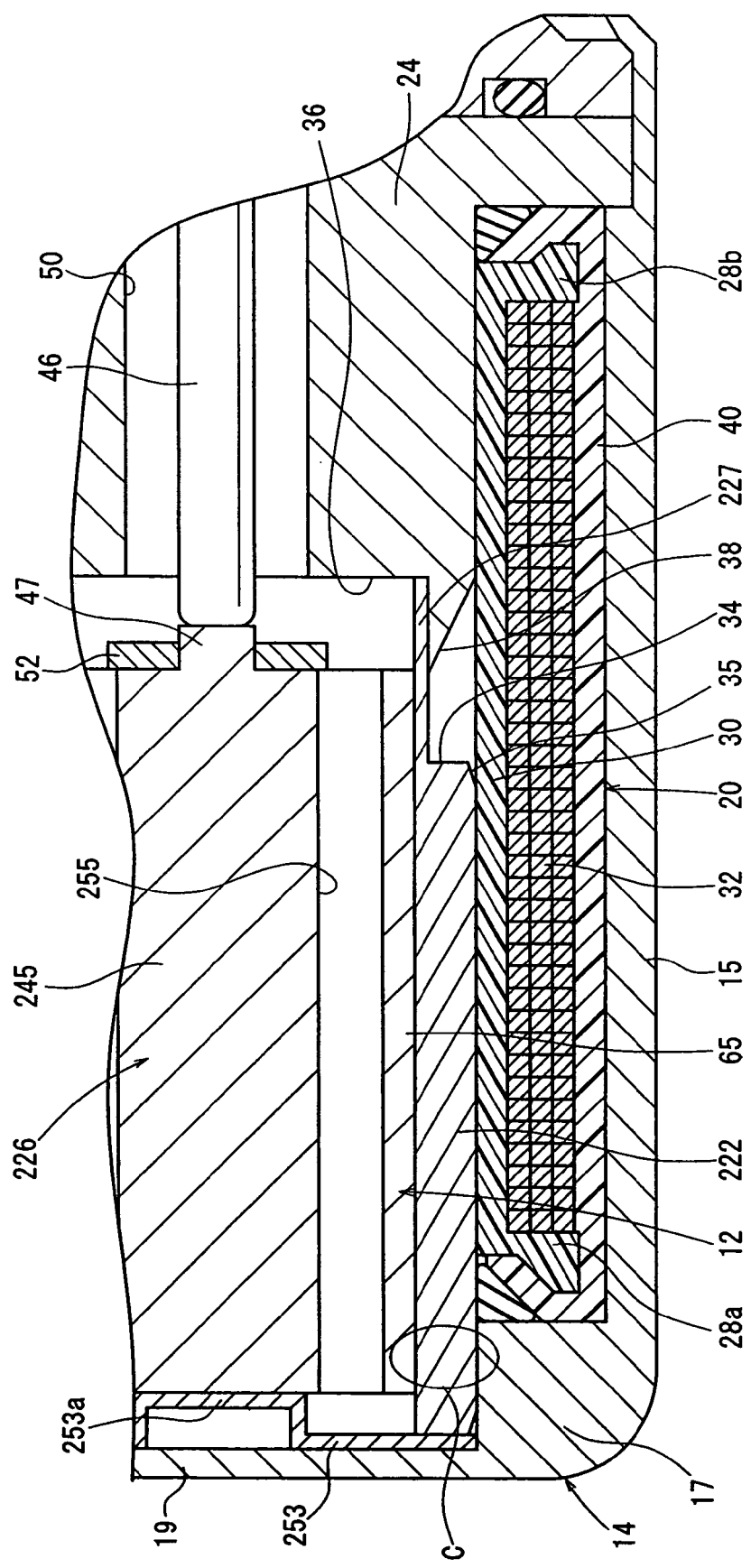
FIG. 22 is an enlarged fragmentary longitudinal cross-sectional view of a coil assembly of the hydraulic control valve shown in FIG. 18.
Figure 23:
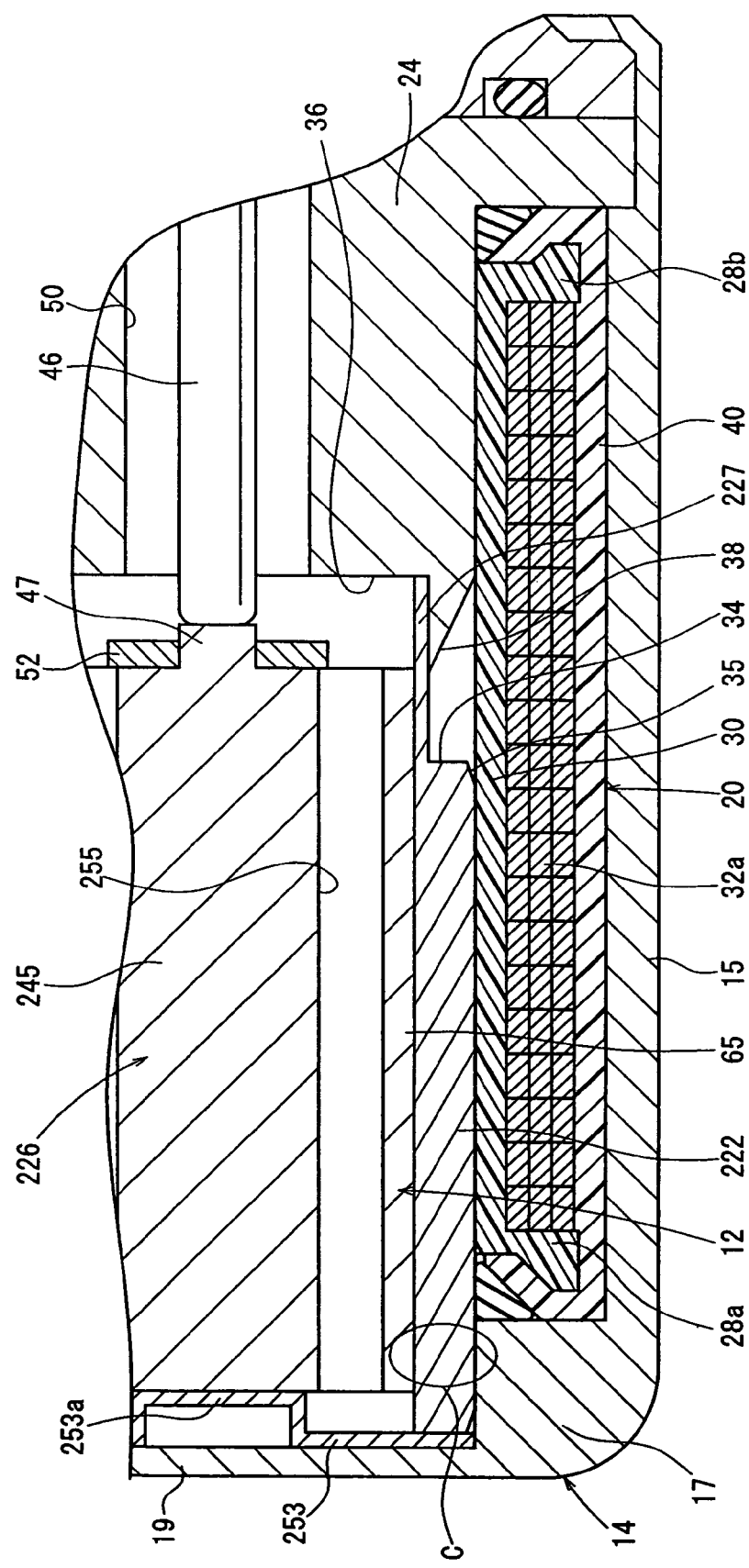
FIG. 23 is an enlarged fragmentary longitudinal cross-sectional view of a modification of the coil assembly shown in FIG. 22.
Figure 24:
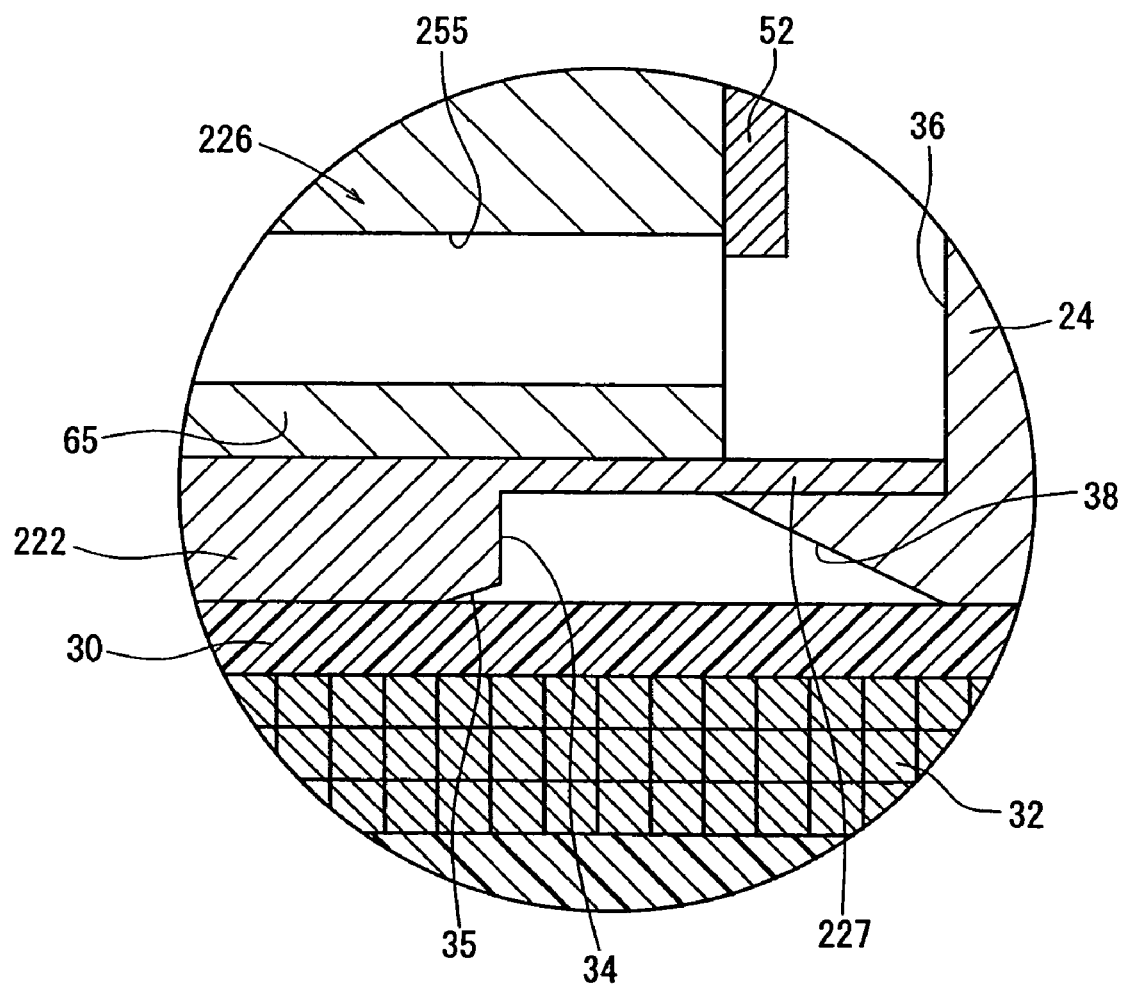
FIG. 24 is an enlarged fragmentary longitudinal cross-sectional view showing a thin-walled annular portion of a yoke which is lightly press-fitted in a recess in a fixed core.
Figure 25:
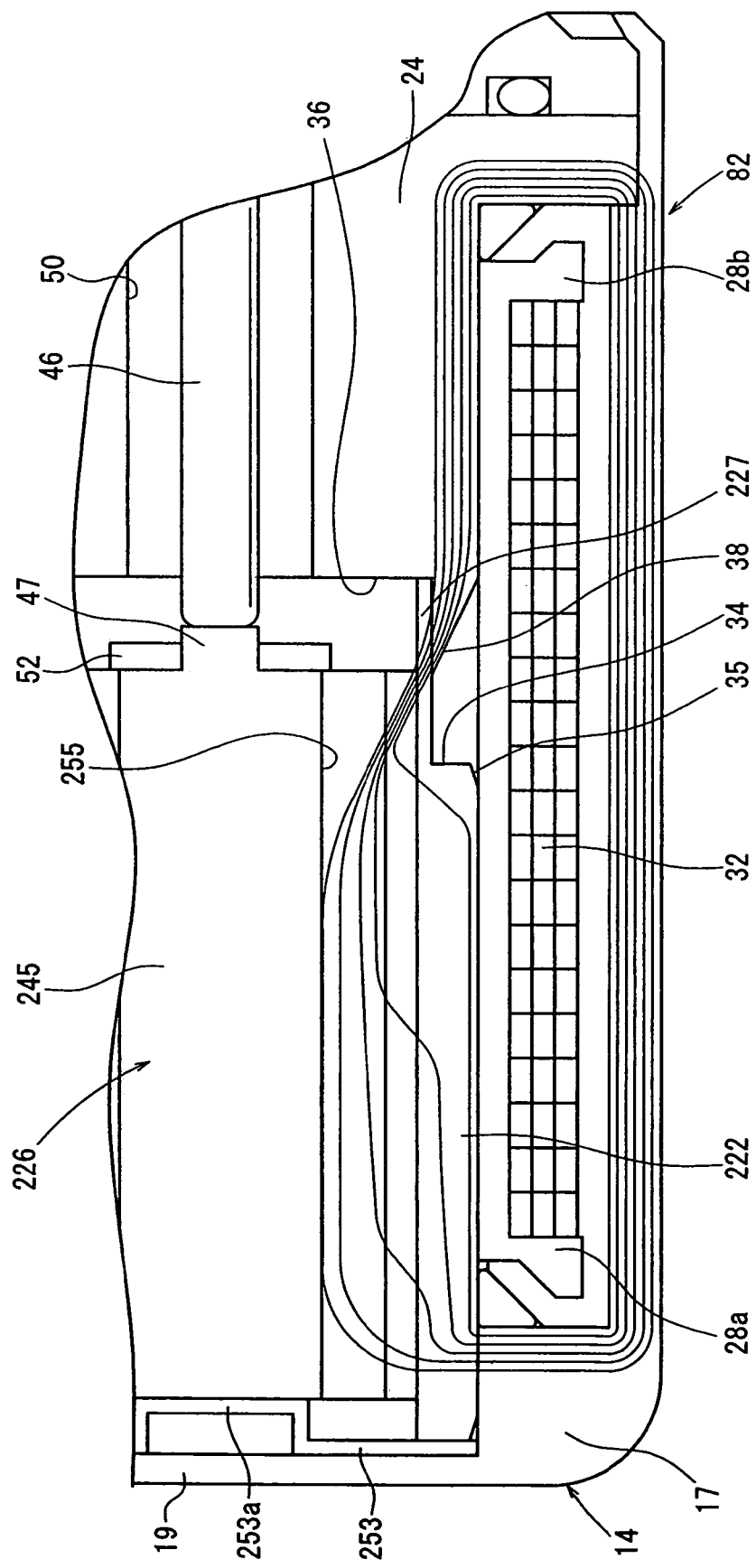
FIG. 25 is an enlarged fragmentary view showing a magnetic circuit of the solenoid.

As shown in FIGS. 22 through 24, the yoke 222 comprises a substantially tubular member separate from the housing 14 and has an axial end press-fitted in and held by an inner wall in a bottom 17 of the housing 14. The yoke 222 has a thin-walled annular sleeve 227 axially projecting a predetermined distance toward the fixed core 24.

The tubular yoke 222 and the recess 36 defined in the fixed core 24 are complementary in shape to the movable core 226, providing a linear solenoid structure in which the movable core 226 is slidable between the tubular yoke 222 and the recess 36 defined in the fixed core 24.

As shown in FIG. 24, the thin-walled annular sleeve 227 which axially projects from the flat surface 34 on the end of the tubular yoke 222 by the predetermined distance is axially disposed between the yoke 222 and the fixed core 24. The thin-walled annular sleeve 227 is lightly press-fitted in the recess 36 and joined to the inner wall surface of the fixed core 24 which defines the recess 36. The thin-walled annular sleeve 227 thus keeps the yoke 222 and the fixed core 24 highly accurately in coaxial alignment with each other, and allows the yoke 222 and the fixed core 24 to be assembled with greater ease.

Specifically, the fixed core 24 with a conical surface 38 on its outer circumference and the tubular yoke 222 are separate from each other, and the thin-walled annular sleeve 227 that is formed integrally with the end of the yoke 222 is lightly press-fitted into the recess 36 along the inner circumferential surface of the recess 36, holding the yoke 222 and the fixed core 24 highly accurately in coaxial alignment with each other.

Since the yoke 222 and the fixed core 24 are kept highly accurately in coaxial alignment with each other, the movable core 226 can smoothly move reciprocally along the inner wall surface of the yoke 222 or the fixed core 24, and side forces acting on the movable core 226 are reduced to allow the movable core 226 to move reciprocally smoothly. Therefore, hysteresis is reduced when the movable core 226 moves reciprocally, and the solenoid 12 has good hysteresis characteristics.

The thin-walled annular sleeve 227 has an inner circumferential surface functioning as a guide surface surrounding the outer circumferential surface of the movable core 226 with a predetermined clearance interposed therebetween, for thereby guiding the movable core 226 well for better linear movement.

The thin-walled annular sleeve 227 that joins the yoke 222 and the fixed core 24 to each other is of a very small thickness such as of about 0.3 mm, for example. The thin-walled annular sleeve 227 thus has a reduced magnetic path area and functions as a magnetic resistance for reducing magnetic fluxes flowing directly between the yoke 222 and the fixed core 24.

Furthermore, even though the two members, i.e., the yoke 222 with the thin-walled annular sleeve 227 and the fixed core 24, are assembled together, they achieve a predetermined mechanical strength. The assembly of the yoke 222 and the fixed core 24 which are joined by the thin-walled annular sleeve 227 is made up of a greater number of parts, but can be manufactured more easily, than if the yoke, the fixed core, and the thin-walled annular sleeve were integrally combined with each other, i.e., if they were constructed as a single structure.

The movable core 226 comprises a cylindrical movable core body 245, and a boss 47 formed integrally with the central region of an end of the movable core body 245 and projecting slightly toward the fixed core 24. The other end of the movable core 226 which faces a thin-walled region 19 of the housing 14 is formed as a flat surface.

A ring 52 is mounted on the outer circumferential surface of the boss 47. The ring 52 is made of a nonmagnetic material and functions as a spacer for preventing residual magnetism from being produced in the solenoid 12.

The other end of the movable core body 245 is disposed for abutment against a raised region 253a of a plate 253 which is mounted on the inner wall of the bottom 17 of the housing 14. The plate 253 is made of a nonmagnetic material and functions as a spacer for preventing residual magnetism from being produced in the solenoid 12, as with the ring 52.

The movable core body 245 has a plurality of inner passages 255 extending parallel to the axis thereof and provided by holes defined therethrough between the opposite ends thereof. The inner passages 255 has a function to increase the magnetic path area for passing magnetic fluxes therethrough and also to pass oil under pressure remaining in the space between the thin-wall region 19 of the housing 14 through the inner passages 255 toward the fixed core 24, allowing the movable core 226 to return quickly, when the movable core 226 is displaced toward the thin-wall region 19.

Figure 20:
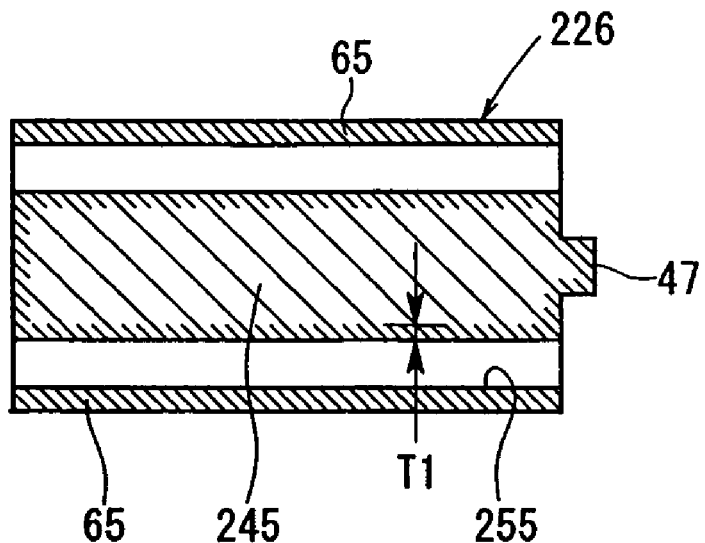
FIG. 20 is an enlarged longitudinal cross-sectional view of a movable core shown in FIG. 18, which has a thin nonmagnetic layer disposed on an entire outer surface thereof.
Figure 21:
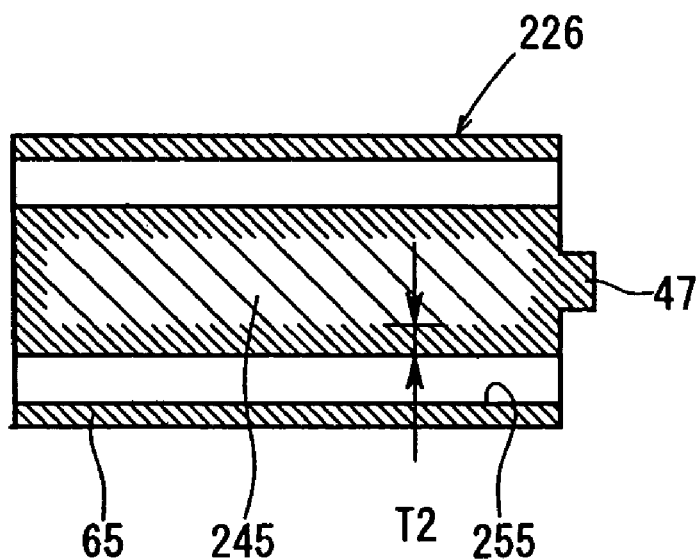
FIG. 21 is an enlarged longitudinal cross-sectional view of a movable core shown in FIG. 18, which has a thick nonmagnetic layer disposed on an entire outer surface thereof.

The movable core 226 has a nonmagnetic layer 65 on its entire outer surface, the nonmagnetic layer 65 having a predetermined depth (see FIGS. 20 and 21).

In the third embodiment, the thin-walled annular sleeve 227 disposed on the end of the yoke 222 is lightly press-fitted along the inner circumferential surface of the recess 36 in the fixed core 24, thereby integrally assembling the yoke 222 and the fixed core 24 together (see FIG. 24). The yoke 222 with the thin-walled annular sleeve 227 keeps the yoke 222 and the fixed core 24 highly accurately in coaxial alignment with each other, and allows the yoke 222 and the fixed core 24 to be assembled with greater ease.

Since the yoke 222 and the fixed core 24 are kept highly accurately in coaxial alignment with each other by the thin-walled annular sleeve 227, the movable core 226 can smoothly move reciprocally along the yoke 222 or the fixed core 24, and side forces acting on the movable core 226 are reduced to allow the movable core 226 to move reciprocally smoothly. Therefore, hysteresis is reduced when the movable core 226 moves reciprocally, and the solenoid 12 has good hysteresis characteristics.

The thin-walled annular sleeve 227 has an inner circumferential surface functioning as a guide surface surrounding the outer circumferential surface of the movable core 226 with a predetermined clearance interposed therebetween, for thereby guiding the movable core 226 well for better linear movement.

The thin-walled annular sleeve 227 that joins the yoke 222 and the fixed core 24 to each other is of a very small thickness such as of about 0.3 mm, for example. The thin-walled annular sleeve 227 thus has a reduced magnetic path area and functions as a magnetic resistance for reducing magnetic fluxes flowing directly between the yoke 222 and the fixed core 24.

In the third embodiment, in addition, the outer circumferential surface of the end of the movable core 226 is disposed at a position which corresponds to the inner wall surface of the bottom 17 of the housing 14 (see an encircled portion C in FIG. 22). Therefore, magnetic fluxes that run from the bottom 17 of the housing 14 to the movable core 226 are also transferred between the inner wall surface of the bottom 17 and the outer circumferential surface of the movable core 226 (see FIG. 25). Therefore, magnetic fluxes are smoothly transferred between the bottom 17 of the housing 14 and the end of the movable core 226, so that an increased amount of magnetic fluxes can be generated by the magnetic circuit.

As a result, the solenoid 12 can produce increased attractive forces. If the solenoid 12 is to produce the same attractive forces as a conventional solenoid, then the hydraulic control valve 210 according to the third embodiment can be reduced in overall size.

A hydraulic control valve 310 according to a fourth embodiment of the present invention is shown in FIGS. 26 through 30.

Figure 26:
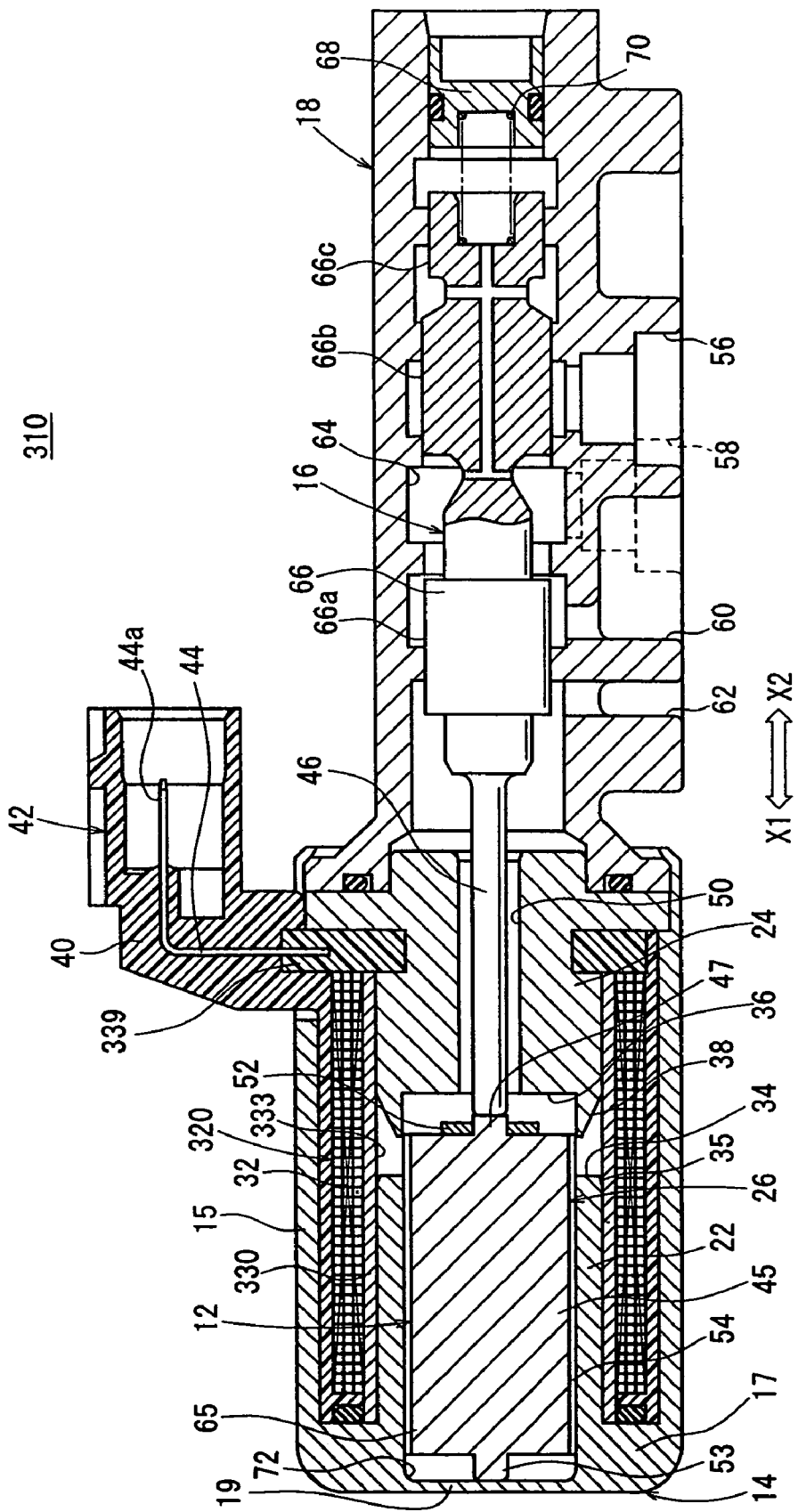
FIG. 26 is a longitudinal cross-sectional view of a hydraulic control valve according to a fourth embodiment of the present invention, taken along an axial direction thereof.
Figure 27:
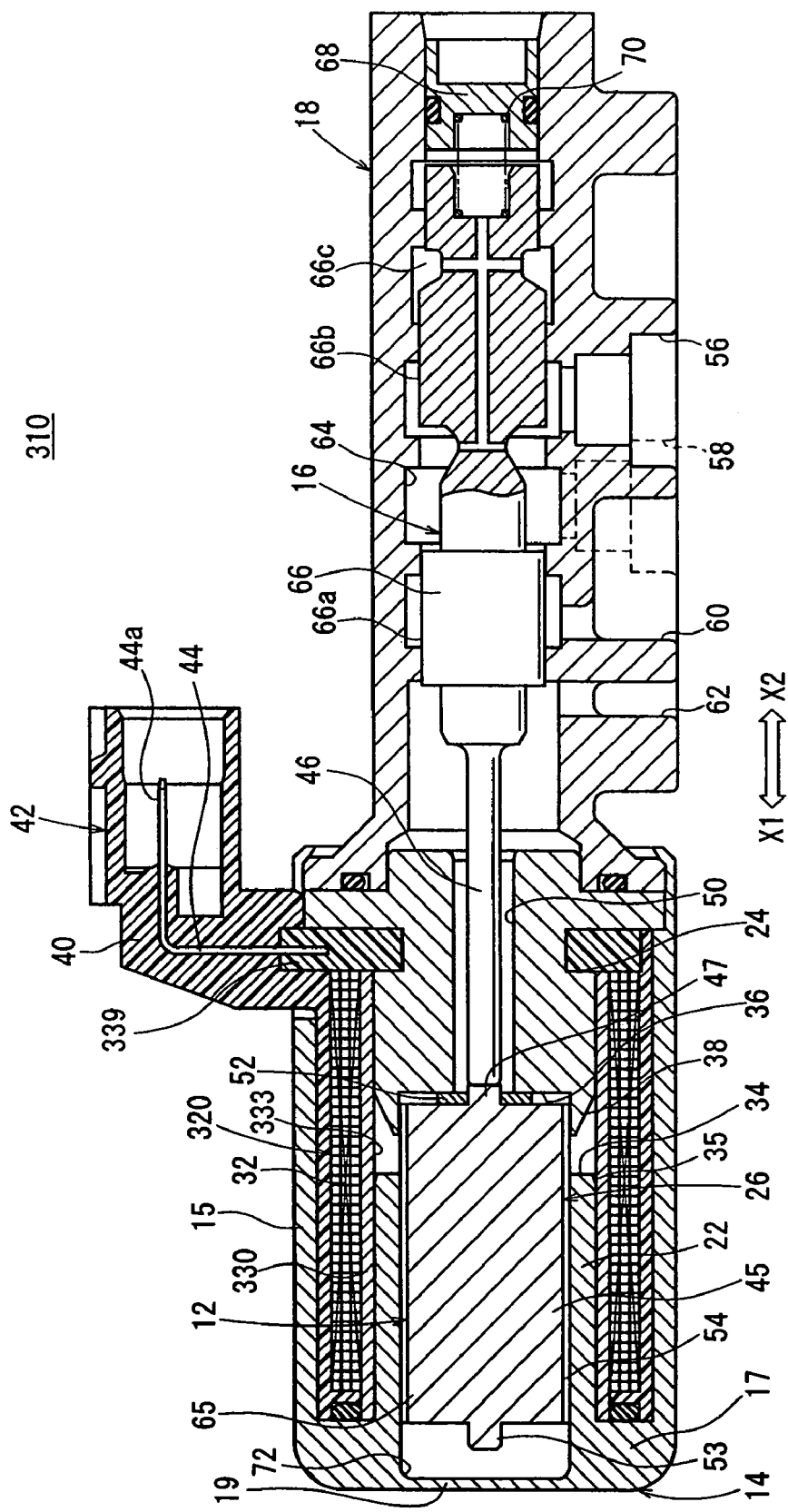
FIG. 27 is a longitudinal cross-sectional view of the hydraulic control valve, showing a spool valve displaced when a solenoid of the hydraulic control valve shown in FIG. 26 is energized.

The hydraulic control valve 310 according to the fourth embodiment has a coil assembly 320 disposed in a housing 14. The coil assembly 320 comprises a pipe 330 in the form of an elongate hollow cylindrical member made of a nonmagnetic metal material such as stainless steel or the like and having uniform diameters (inside and outside diameters) in the axial direction, and a coil 32 having a plurality of turns wound around the pipe 330 and comprising a conductive wire having a square cross section, as shown in FIGS. 26 through 28.

Figure 28:
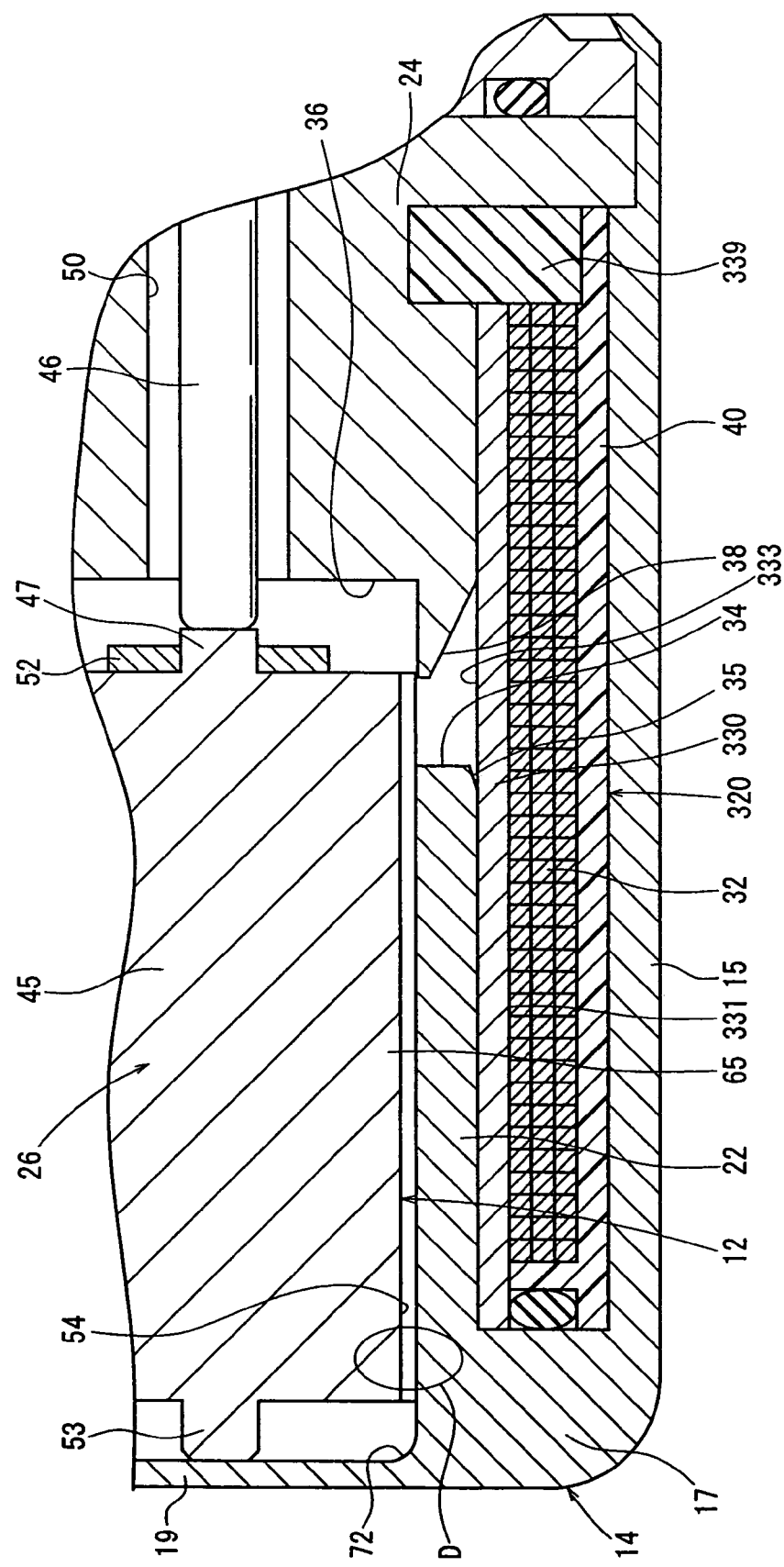
FIG. 28 is an enlarged fragmentary longitudinal cross-sectional view of a coil assembly of the hydraulic control valve shown in FIG. 26.

The pipe 330 on which the coil 32 is wound has an outer surface coated with an insulating film 331, as shown in FIG. 28. Since the coil 32 is wound around the pipe 330, a coil bobbin made of a resin material which has heretofore been employed is dispensed with.

The coil 32 of square cross section which is wound around the pipe 330 allows its turns held in surface-to-surface contact with each other. Therefore, the turns of the coil 32 are stably arrayed in desired positions. Since the turns of the coil 32 are thus stably arrayed, one of the flanges on the axially spaced ends of the pipe 330 may be dispensed. If one of the flanges is dispensed with, the axial dimension of the solenoid 12 is reduced to make the solenoid 12 smaller in size.

If a conventional coil comprising a conductive wire of circular cross section is wound around a coil bobbin, as shown in FIG. 31, then the coil is subject to forces tending to cause the coil to collapse toward a flange under the tension of the wound coil. The coil 32 of square cross section has its turns held in surface-to-surface contact with each other and is not subject to forces tending to cause the coil 32 to collapse toward the ends of the pipe 330. Consequently, one of the flanges may be dispensed with.

Figure 29:
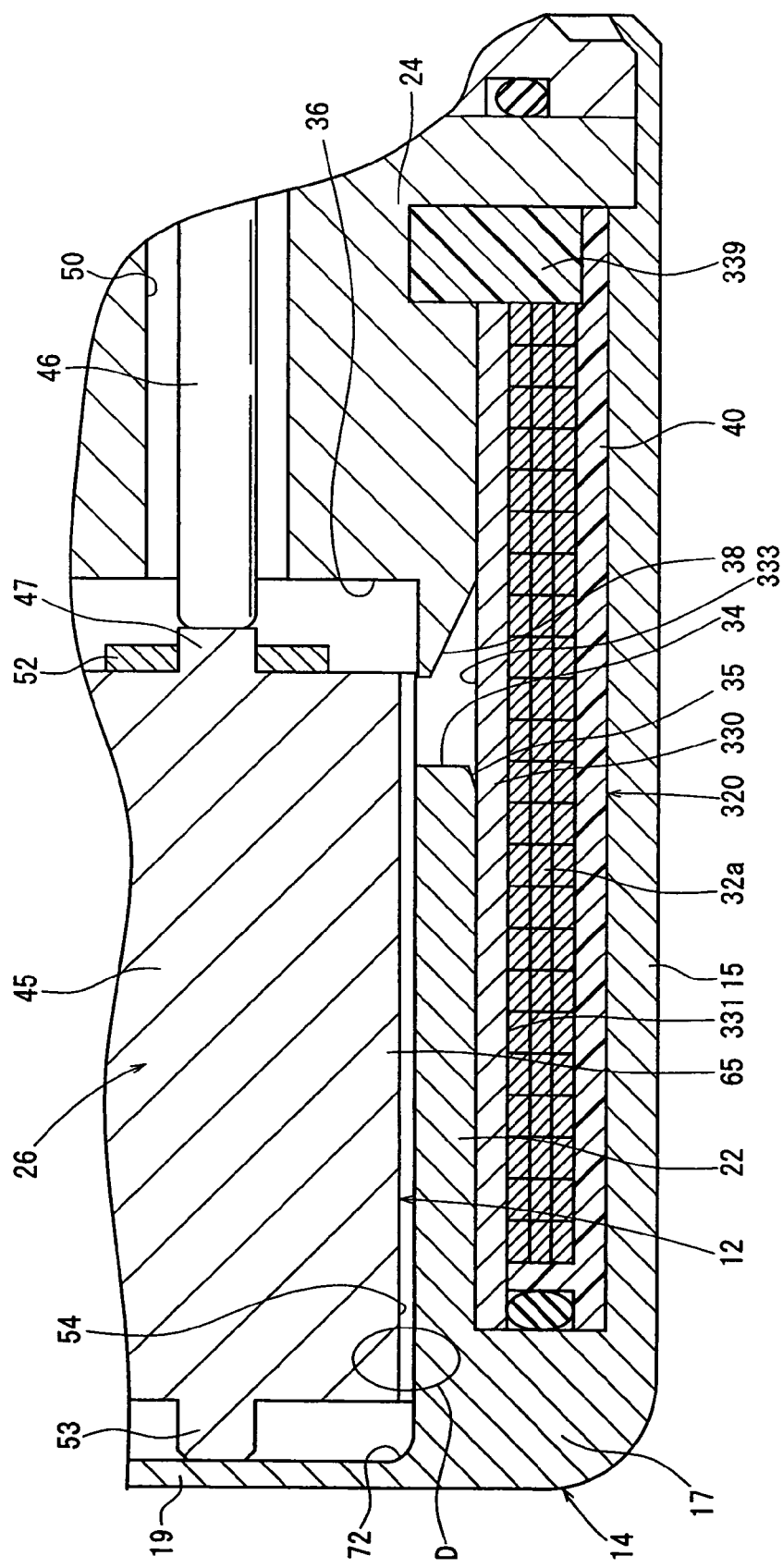
FIG. 29 is an enlarged fragmentary longitudinal cross-sectional view of a modification of the coil assembly shown in FIG. 28.
Figure 30:
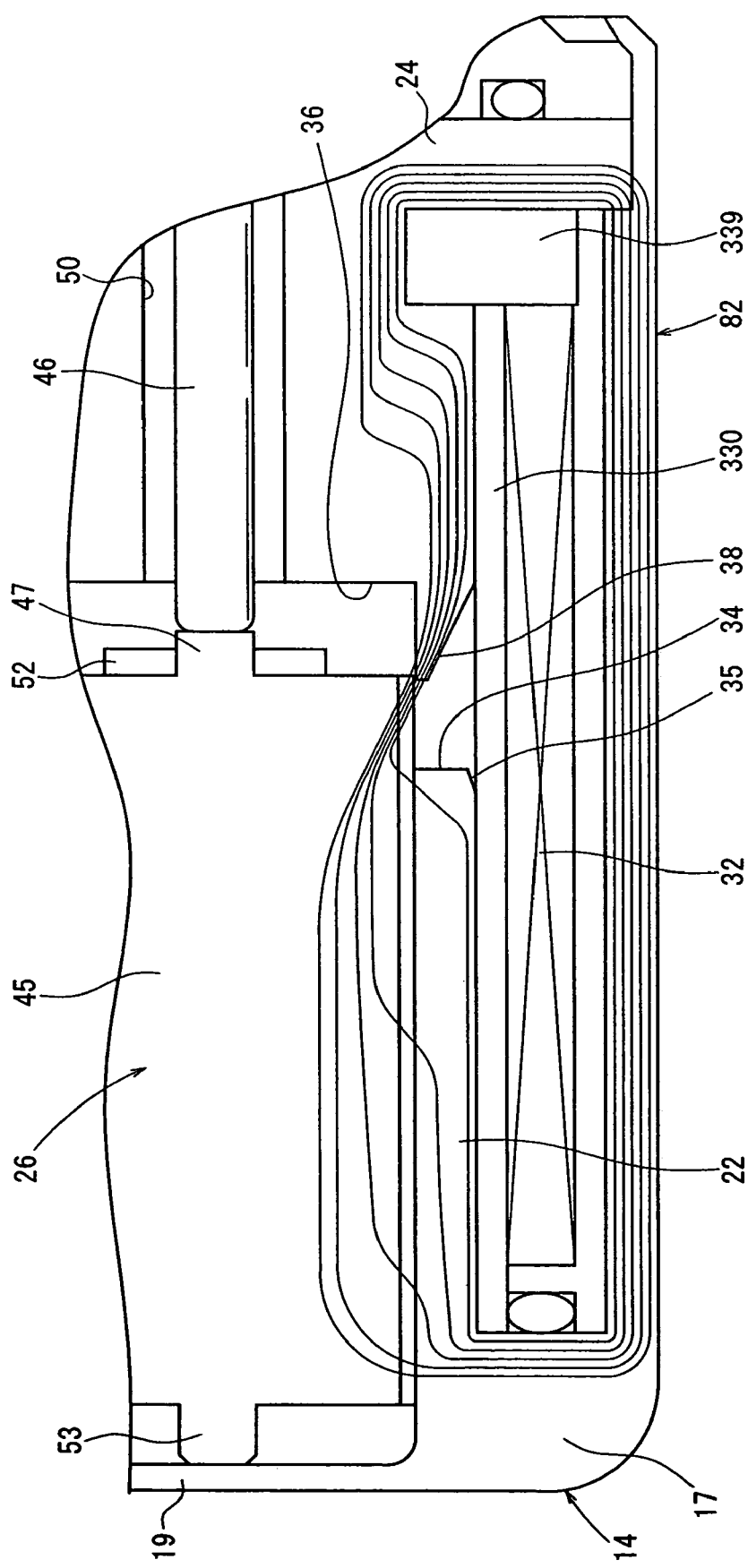
FIG. 30 is an enlarged fragmentary view showing a magnetic circuit of the solenoid.

As shown in FIG. 29, the solenoid 12 may have a coil 32a comprising a flat conductive wire of elongate rectangular cross section. However, the coil 32 of square cross section can be wound in a smaller space than the coil 32a of elongate rectangular cross section. Furthermore, since the coil 32 of square cross section has a smaller cross-sectional circumferential dimension than the coil 32a of elongate rectangular cross section, the cross-sectional area of an insulating film on the coil 32 may be set to a small value.

The tubular yoke 22 and the recess 36 defined in the fixed core 24 are complementary in shape to the movable core 26, providing a linear solenoid structure in which the movable core 26 is slidable between the tubular yoke 22 and the recess 36 defined in the fixed core 24.

As shown in FIG. 26, the yoke 22 and the fixed core 24 are press-fitted in a hole 333 in the pipe 330 which is integrally formed of a nonmagnetic metal material, and are kept coaxially spaced a predetermined distance from each other.

Specifically, the pipe 330 surrounding and holding the outer circumferential surface of the yoke 22 and the outer circumferential surface of the fixed core 24 keeps the yoke 22 and the fixed core 24 highly accurately in coaxial alignment with each other, and allows the yoke 22 and the fixed core 24 to be assembled with greater ease.

Since the yoke 22 and the fixed core 24 are kept highly accurately in coaxial alignment with each other, the movable core 26 can smoothly move reciprocally along the yoke 22 or the fixed core 24, and side forces acting on the movable core 26 are reduced to allow the movable core 26 to move reciprocally smoothly. Therefore, hysteresis is reduced when the movable core 26 moves reciprocally, and the solenoid 12 has good hysteresis characteristics.

A synthetic resin sealing body 40 which is molded over the outer circumferential surface of the coil 32, a portion of the pipe 330, and a disk-shaped member 339 is disposed between the housing 14 and the coil 32. The synthetic resin sealing body 40 is molded of a synthetic resin material integrally with a coupler 42. The coupler 42 has a terminal 44 electrically connected to the coil 32 and having an exposed terminal end 44a that is electrically connected to a power supply. The disk-shaped member 339 is made of a resin material and fitted in an annular groove defined in the outer circumferential surface of the fixed core 24.

The coil 32 has its outer circumferential surface covered with the synthetic resin sealing body 40 for being stably protected. If one of the ends of the coil 32 wound around the pipe 330 is covered with a flange of the synthetic resin sealing body 40, the coil 32 is more stably protected.

In the fourth embodiment, the yoke 22 and the fixed core 24 are press-fitted in the hole 333 in the single pipe 330 which is made of a nonmagnetic metal material (see FIG. 26). The pipe 330 keeps the yoke 22 and the fixed core 24 highly accurately in coaxial alignment with each other, and allows the yoke 22 and the fixed core 24 to be assembled with greater ease.

Specifically, the yoke 22 and the fixed core 24 are highly accurately aligned coaxially with each other as they are held by the inner circumferential surface of the hole 333 in the pipe 330 which is made of a nonmagnetic metal material. Since the yoke 22 and the fixed core 24 are kept highly accurately in coaxial alignment with each other, the movable core 26 can smoothly move reciprocally along the yoke 22 or the fixed core 24, and side forces acting on the movable core 26 are reduced to allow the movable core 26 to move reciprocally smoothly along the yoke 22 or the fixed core 24. Therefore, the solenoid 12 provides good hysteresis characteristics when the movable core 26 moves reciprocally.

In the fourth embodiment, furthermore, the coil 32 wound around the pipe 330 is of square cross section, thereby minimizing any gaps between stacked turns of the coil 32. Therefore, the total cross-sectional area of the coil 32, i.e., the overall space occupied by the coil 32 wound around the pipe 330, is smaller than that of the conventional solenoid coil of circular cross section which has the same number of turns as the coil 32.

Stated otherwise, the ratio of the cross-sectional area of the conductor of the coil 32 to the space in which the coil 32 is wound, i.e., the conductor occupation ratio, may be greater than that of the solenoid coil of circular cross section.

Since the space in which the coil 32 is wound can be reduced, the pipe 330 can be reduced in size, resulting in a reduction in the overall size of the solenoid 12.

If the space in which the coil 32 is wound is the same as the space in which the solenoid coil of circular cross section is wound, then the number of turns of the coil 32 of square cross section on the pipe 330 is greater than that of the solenoid coil of circular cross section. Accordingly, the solenoid 12 can produce greater attractive forces (electromagnetic forces) than the solenoid coil of circular cross section.

Furthermore, since the space in which the coil 32 is wound can be reduced, the total dimension (total length) of the continuous wire of the coil 32 can be reduced, and hence the resistance of the coil 32 can be reduced. As a result, the electric power consumed when the coil 32 is energized can be reduced.

If the coil 32 of square cross section has the same resistance as the solenoid coil of circular cross section, then the number of turns of the coil 32 wound around the pipe 330 is increased for producing increased attractive forces (electromagnetic forces).

Moreover, the outer circumferential surface of the end of the movable core 26 is disposed between the bottom 17 of the housing 14 and the tubular yoke 22 at a position which corresponds to the inner wall surface of the bottom 17 of the housing 14 (see an encircled portion D in FIG. 29). Therefore, magnetic fluxes that run from the bottom 17 of the housing 14 to the movable core 26 are also transferred between the inner wall surface of the bottom 17 and the outer circumferential surface of the movable core 26 (see FIG. 30). Therefore, magnetic fluxes are smoothly transferred between the bottom 17 of the housing 14 and the end of the movable core 26, so that an increased amount of magnetic fluxes can be generated by the magnetic circuit.

Although certain preferred embodiments of the present invention have been shown and described in detail, it should be understood that various changes and modifications may be made therein without departing from the scope of the appended claims.

What is claimed is:

1. A linear solenoid valve for generating an electromagnetic force in proportion to an amount of current supplied to a solenoid and displacing a valve element under the generated electromagnetic force, comprising:
   a valve casing including a valve body having an inlet port and an outlet port for passage of a fluid under pressure therethrough, and a housing joined to said valve body;
   a solenoid mounted in said housing and having a coil wound around a coil bobbin, a fixed core, a movable core for being attracted to said fixed core when said coil is energized, and a tubular yoke surrounding said movable core; and
   a valve mechanism mounted in said valve body and having a valve element for selectively bringing said inlet port and said outlet port into and out of fluid communication with each other responsive to a displacement of said movable core;
   said movable core having a nonmagnetic layer formed on an outer surface thereof and having a predetermined thickness;
   said tubular yoke having a thin-walled annular sleeve lightly press-fitted inside a recess defined in said fixed core.

2. A linear solenoid valve according to claim 1, wherein the thickness of said nonmagnetic layer is in the range from 10 μm to 30 μm.

3. A linear solenoid valve according to claim 1, wherein the thickness of said nonmagnetic layer is in the range from 50 μm to 100 μm.

4. A linear solenoid valve according to claim 1, wherein said nonmagnetic layer is formed by a high-frequency induction hardening process performed on said movable core.

5. A linear solenoid valve according to claim 1, wherein said coil comprises a wire of square cross section.

6. A linear solenoid valve according to claim 1, wherein said coil comprises a wire of elongate rectangular cross section.

7. A linear solenoid valve according to claim 1, wherein said thin-walled annular sleeve projects axially a predetermined distance from a surface disposed on an end of said tubular yoke and lying perpendicular to the axis of said tubular yoke.

8. A linear solenoid valve according to claim 1, wherein said solenoid further includes a plate mounted on an inner wall of a bottom of said housing, said plate having a raised region held in abutment against a flat end face of said movable core.

9. A linear solenoid valve according to claim 1, wherein said movable core has a plurality of inner passages extending parallel to the axis thereof and extending therethrough between opposite ends thereof.

10. A linear solenoid valve according to claim 1, wherein said thin-walled annular sleeve has a thickness of about 0.3 mm.

* * * * *